US012699297B2

(12) United States Patent
Chen et al.

(10) Patent No.: US 12,699,297 B2
(45) Date of Patent: Aug. 4, 2026

(54) ELECTROCHROMIC DEVICE WITH MULTIPLE ELECTROCHROMIC LAYERS

(71) Applicant: AMBILIGHT INC, Grand Cayman (KY)

(72) Inventors: Ke Chen, Lafayette, IN (US); Jianguo Mei, West Lafayette, IN (US)

(73) Assignee: Ambilight Inc., Milpitas, CA (US)

( * ) Notice: Subject to any disclaimer, the term of this patent is extended or adjusted under 35 U.S.C. 154(b) by 444 days.

(21) Appl. No.: 18/266,548

(22) PCT Filed: Jul. 15, 2021

(86) PCT No.: PCT/US2021/041863
§ 371 (c)(1),
(2) Date: Jun. 9, 2023

(87) PCT Pub. No.: WO2022/103452
PCT Pub. Date: May 19, 2022

(65) Prior Publication Data
US 2024/0126129 A1 Apr. 18, 2024

Related U.S. Application Data

(60) Provisional application No. 63/114,415, filed on Nov. 16, 2020.

(51) Int. Cl.
*G02F 1/153* (2006.01)
*G02F 1/1516* (2019.01)
*G02F 1/163* (2006.01)

(52) U.S. Cl.
CPC ........ *G02F 1/1533* (2013.01); *G02F 1/15165* (2019.01); *G02F 1/163* (2013.01); *G02F 2001/1536* (2013.01)

(58) Field of Classification Search
CPC .... G02F 1/1533; G02F 1/15165; G02F 1/163; G02F 2001/1536; G02F 1/153
USPC .......................................................... 359/265
See application file for complete search history.

(56) References Cited

U.S. PATENT DOCUMENTS 5,254,637 A * 10/1993 Witzeman ............. C07C 69/738 428/458
2009/0243832 A1 10/2009 Hyde et al.
2010/0157409 A1* 6/2010 Brabec .................... G02F 1/153 445/24

(Continued)

OTHER PUBLICATIONS

Written Opinion and International Search Report for PCT Application No. PCT/US2021/041863 mailed on Dec. 17, 2021, 12 pages.

(Continued)

*Primary Examiner* — Mohammed A Hasan
(74) *Attorney, Agent, or Firm* — Dickinson Wright PLLC

(57) ABSTRACT

An electrochromic device has a plurality of electrochromic layers stacked sequentially with underlying electrochromic layers crosslinked. The crosslinked electrochromic layers are solution-processable without compromising their optical and electrochromic performances. The disclosed electrochromic device can produce a full-color palette with a minimized intermediate color and show a multicolor capability. Multilayer electrochromic polymer patterns with surface texture information are made. The method for controlling electrochromism or multicolor electrochromism is discussed.

10 Claims, 24 Drawing Sheets

(56) References Cited

U.S. PATENT DOCUMENTS

| | | | | |
|---|---|---|---|---|
| 2011/0081735 | A1 | 4/2011 | Coe et al. | |
| 2015/0053331 | A1* | 2/2015 | Tu | G02F 1/1508 156/182 |
| 2017/0235203 | A1 | 8/2017 | Yamamoto et al. | |
| 2017/0342182 | A1 | 11/2017 | Pesek et al. | |
| 2019/0137841 | A1 | 5/2019 | Koo et al. | |
| 2019/0361308 | A1* | 11/2019 | Park | G02F 1/163 |
| 2020/0103718 | A1* | 4/2020 | Okada | G02F 1/155 |

OTHER PUBLICATIONS

International Preliminary Report on Patentability for PCT Application No. PCT/US2021/041863 mailed on May 23, 2023, 9 pages.

* cited by examiner

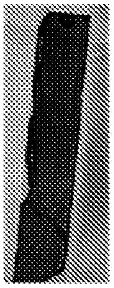
FIG. 14(A)
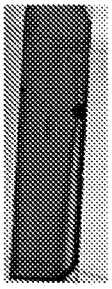
FIG. 14(B)
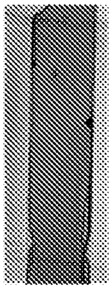
FIG. 14(C)
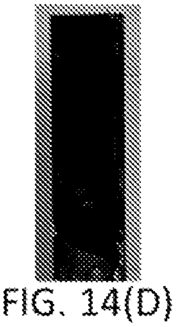
FIG. 14(D)
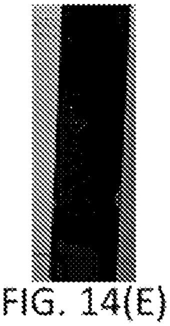
FIG. 14(E)
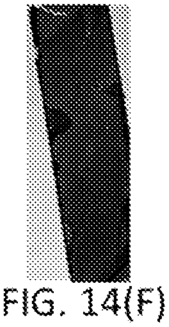
FIG. 14(F)
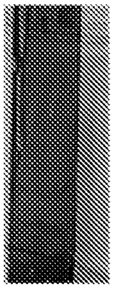
FIG. 14(G)
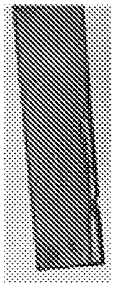
FIG. 14(H)
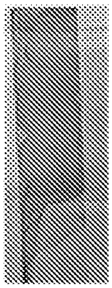
FIG. 14(I)
FIG. 14

ECP-Y + ECP-M

ECP-C + ECP-M

Thicker ECP-Y + thinner ECP-M

Thinner ECP-Y +thicker ECP-M

ELECTROCHROMIC DEVICE WITH MULTIPLE ELECTROCHROMIC LAYERS

CROSS REFERENCE TO RELATED APPLICATIONS

This application is a U.S. National Stage Application of International Patent Application No. PCT/US2021/041863, filed on Jul. 15, 2021, which claims priority to and benefits of Provisional Application No. 63/114,415, filed on Nov. 16, 2020. The content of all of the above-references applications is incorporated herein by reference in their entirety.

TECHNICAL FIELD

The present disclosure is related to an electrochromic device with a plurality of electrochromic layers, a device incorporating the electrochromic device, and a method to control the electrochromism or multicolor electrochromism of an electrochromic device.

BACKGROUND

Expanding the color selection pool of electrochromic devices (ECDs) is crucial for their wide application in full-color displays and information expression. A full-color palette of electrochromic polymers (ECPs) can be achieved via tuning molecular structures by chemical synthesis or mixing various ECPs with primary colors based on subtractive color mixing theory. However, the synthetic approach with varying the backbones or sidechains is complicated and time-consuming due to high synthesis requirements and sophisticated relationships between polymer structures and colors. Color mixing by physically blending various ECPs with primary colors suffers from unwanted intermediated color and phase separation. Furthermore, conventional multicolor electrochromic devices usually require either complex device structure design or difficult EC material selection. So, to develop an ECD which can produce not only a full-color palette but also a multicolor capability in a facile and flexible format is highly desired.

SUMMARY

Described herein is an electrochromic device comprising a first transparent electrode, a plurality of electrochromic layers stacked sequentially on the first transparent electrode with an upper electrochromic layer deposited on an underlying electrochromic layer, an ion storage layer disposed on the electrochromic layers, and a second transparent electrode disposed on the ion storage layer. The underlying electrochromic layer comprises a crosslinked electrochromic layer which presents solvent resistance to a solvent used in the upper electrochromic layer.

In some embodiments, an uppermost electrochromic layer of the electrochromic layers is crosslinked.

The crosslinking of the electrochromic layer happens with or without a crosslinker.

A film thickness of each of the electrochromic layers is adjusted to achieve different colors.

Different electrochromic layers with different electrochromic materials are selected to achieve different colors.

In some embodiments, the disclosed electrochromic device comprises one layer of an electrochromic polymer with cyan color, one layer of an electrochromic polymer with magenta color, and one layer of an electrochromic polymer with yellow color.

In some embodiments, the disclosed electrochromic device presents a black color with a minimized intermediate color. This black electrochromic device comprises the layer of the electrochromic polymer with cyan color as a bottom layer, the layer of the electrochromic polymer with magenta color as a top layer, and the layer of the electrochromic polymer with yellow color interposed between the bottom layer and the top layer. A film-thickness ratio of the three color layers from the bottom to the top is 25:8:10.

The present disclosure is also related to an electronic device incorporating the disclosed electrochromic device.

In some embodiments, the electronic device comprises multilayer electrochromic polymer patterns with surface texture information.

In another aspect, a method for controlling electrochromism or multicolor electrochromism for an electrochromic device with a plurality of electrochromic layers is provided. The method comprises adjusting an electrochromic material and a thickness of each of the electrochromic layers.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings below. For the purpose of illustrating the invention, the drawings show aspects of one or more embodiments of the invention. However, it should be understood that the present invention is not limited to the precise arrangements and instrumentalities shown in the drawings.

FIG. 7(A) shows cyclic voltammetry (CV) data; FIG. 7(B) shows absorbance spectra at colored states; FIG. 7(C) shows full-wavelength transmittance spectra at colored and bleached states; FIG. 7(D) is a diagram illustrating switching kinetics.

FIG. 8(A) is CV data; FIG. 8(B)

shows full-wavelength transmittance spectra at colored and bleached states; FIG. 8(C) is a diagram illustrating switching kinetics.

FIG. 9(A) shows CV data; FIG. 9(B) shows full-wavelength transmittance spectra at colored and bleached states; FIG. 9(C) is a diagram illustrating switching kinetics.

FIG. 12(A) is for 190 nm ECP-M layer with 210 nm ECP-C layer; FIG. 12(B) is for 210 nm ECP-C layer with 160 nm ECP-Y layer; FIG. 12(C) is for 190 nm ECP-M layer with 160 nm ECP-Y layer.

FIG. 13(A) is for 190 nm ECP-M layer with 210 nm ECP-C layer; FIG. 13(B) is for 210 nm ECP-C layer with 160 nm ECP-Y layer; FIG. 13(C) is for 19 nm 0 ECP-M layer with 160 nm ECP-Y layer.

FIGS. 14(A)-(I) are images of example double-layer ECP stacking thin films with different colors, according to various embodiments. FIG. 14(A) is an image for an underlying crosslinked layer prepared by 18 mg/ml ECP-C and a top layer prepared by 30 mg/ml ECP-Y; FIG. 14(B) is an image for an underlying crosslinked layer prepared by 36 mg/ml ECP-C and a top layer prepared by 30 mg/ml ECP-Y; FIG. 14(C) is an image for an underlying crosslinked layer prepared by 72 mg/ml ECP-C and a top layer prepared by 30 mg/ml ECP-Y; FIG. 14(D) is an image for an underlying crosslinked layer prepared by 50 mg/ml ECP-C and a top layer prepared by 30 mg/ml ECP-M; FIG. 14(E) is an image for an underlying crosslinked layer prepared by 50 mg/ml ECP-C and a top layer prepared by 10 mg/ml ECP-M; FIG. 14(F) is an image for an underlying crosslinked layer prepared by 50 mg/ml ECP-C and a top layer prepared by 5 mg/ml ECP-M; FIG. 14(G) is an image for an underlying crosslinked layer prepared by 10 mg/ml ECP-Y and a top layer prepared by 40 mg/ml ECP-M; FIG. 14(H) is an image for a underlying crosslinked layer prepared by 20 mg/ml ECP-Y and a top layer prepared by 40 mg/ml ECP-M; FIG. 14(I) is an image for an underlying crosslinked layer prepared by 30 mg/ml ECP-Y and a top layer prepared by 10 mg/ml ECP-M.

FIG. 15(A) is for ECPs blending and FIG. 15(B) is for ECPs stacking.

FIG. 16(A) is for ECPs blending and FIG. 16(B) is for ECPs stacking.

FIG. 17(A) illustrates transmittance spectra; FIG. 17(B) illustrates double potential step chronoabsorptometry data. The insertions in FIG. 17(B) are images of the example triple-layer ECP stacking thin film showing black color with minimized intermediate color at colored and bleached states, according to one example embodiment.

FIG. 18(A) is an image of an example multilayer electrochromic pattern; FIG. 18(B) is a 2D height map image measured by optical profilometer as the dashed box section in FIG. 18(A)

FIG. 19(A) is under −0.2 V; FIG. 19(B) is under 0.7 V.

FIG. 20(A) is for an example thin film with a crosslinked ECP-Y layer underlying a top ECP-M layer. FIG. 20(B) is for an example thin film with a crosslinked ECP-C layer underlying a top ECP-M layer.

FIG. 22(A) is for an thicker ECP-Y layer underlying a thinner top ECP-M layer; FIG. 22(B) is for an thinner ECP-Y layer underlying a thicker top ECP-M layer.

DETAILED DESCRIPTION OF EMBODIMENTS

Figure 1:
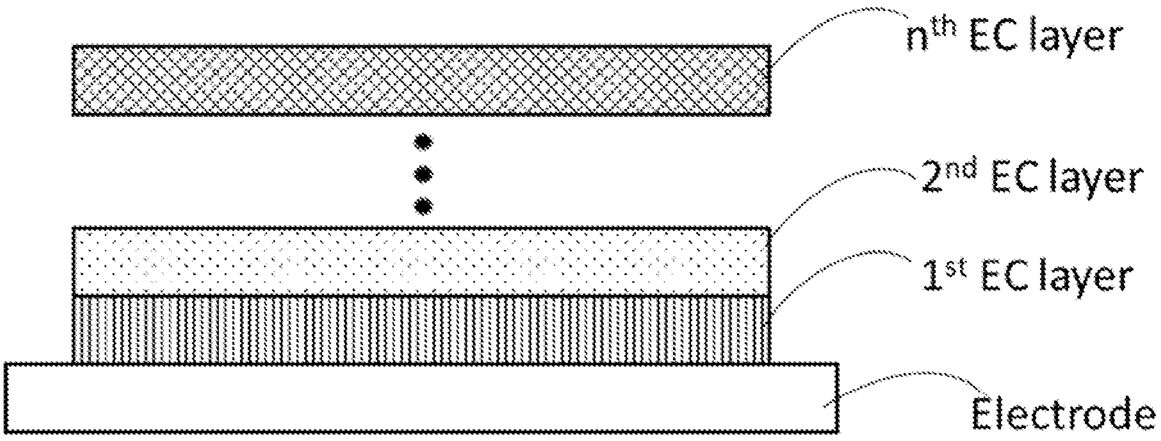
FIG. 1 is a simplified structure of an ECD disclosed here with multiple electrochromic (EC) layers, according to one example embodiment.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it was individually recited herein. Additionally, the singular forms "a" "an", and "the" include plural referents unless the context clearly dictates otherwise.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment, but maybe in some instances. Furthermore, the particular features, structures, or characteristics may be combined in any suitable manner in one or more embodiments.

Three specific electrochromic polymers are used throughout this specification for example purposes. It is to be understood that this disclosure is not limited to these examples. ECP-magenta (ECP-M) is a magenta-colored ECP with Formula 1 listed below. ECP-yellow (ECP-Y) is a yellow-colored ECP with Formula 2 listed below. ECP-cyan (ECP-C) is a cyan-colored ECP with Formula 3 listed below.

Formula 1

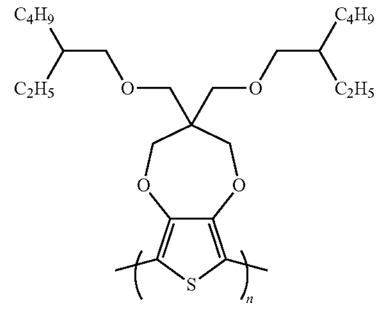

Formula 2

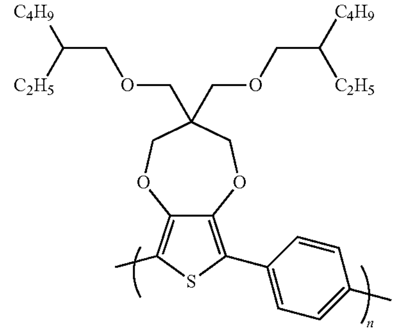

Formula 3

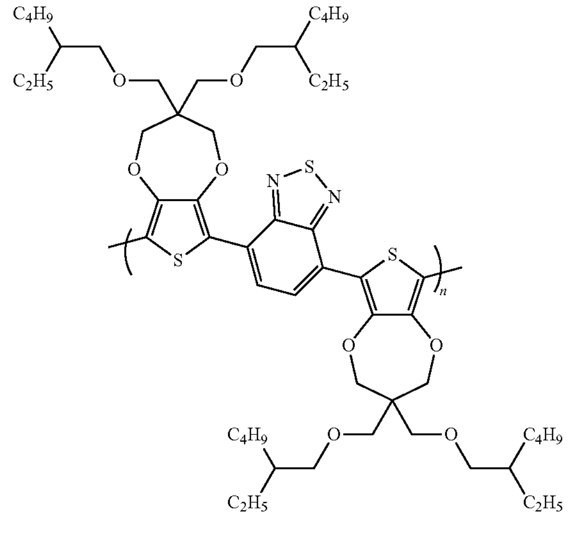

This specification discloses an example electrochromic device comprising a plurality of electrochromic (EC) layers stacked sequentially with an upper electrochromic layer deposited on the top of an underlying electrochromic layer, and the underlying electrochromic layers are crosslinked and present solvent resistance to, for example, a solvent used in the upper electrochromic layer or, generally, other layers immediately next to a crosslinked electrochromic layer.

The crosslinked electrochromic layers can resist a solvent used in a layer immediately above or below the crosslinked electrochromic layer, which might be another electrochromic layer or other layers. The resulting solvent resistance of crosslinked ECPs can avoid dissolution problems of the underlying polymer layer during the coating process of the upper polymer, making it possible to deposit multiple electrochromic layers in solutions. The disclosed stacking process is compatible with all kinds of printing methods and makes manufacturing of multilayer structures feasible. Furthermore, the crosslinked ECPs do not compromise their optical and electrochemical performances, thus allowing the disclosed ECDs to achieve good performance as designed. An ECD disclosed herein can generate secondary or more sophisticated colors which not only enriches the color wheel but also enables multi-color capability. Additionally, an ECD disclosed herein can efficiently minimize an intermediate color which is commonly hard to avoid when using polymer blending techniques.

Figure 2:
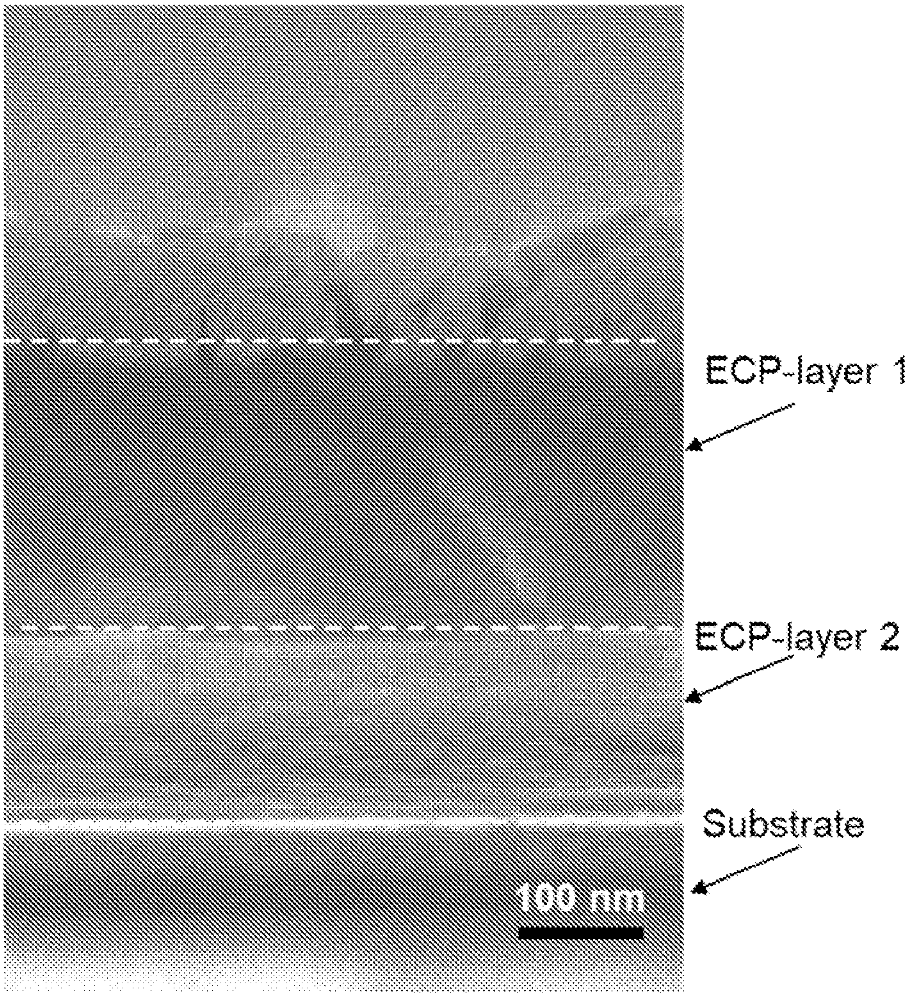
FIG. 2 is a scanning electron microscopic image of an example double-layer ECD disclosed here, according to one example embodiment.

An example layer stacking scheme of this disclosure is shown in FIG. 1. The ECD disclosed here has n electrochromic (EC) layers ($1^{st}$-$n^{th}$ EC layers). The $n^{th}$ layer is the top layer, while the others are underlying EC layers. Each of EC layers may be deposited directly on a previously crosslinked EC layer. All the underlying EC layers are crosslinked, while the $n^{th}$ one can be crosslinked or not crosslinked. The solvent resistant electrochromic layers make the stacking of the EC layers feasible. FIG. 2 shows a microscopic image of an example double-layer ECP stacking thin film on a substrate by successfully deposited one EC layer (e.g., ECP-layer 2) on top of another crosslinked EC layer (e.g., ECP-layer 1).

The crosslinking for crosslinked EC layers can happen with or without a linker. The selection of the crosslinking types and the linkers depends on the EC materials' chemical composition and chemical structure from that particular layer. In some embodiments, EC layers are crosslinked without a linker. For example, an EC material, polysilsesquioxanes containing triarylamine, can be self-crosslinked by forming silsesquioxane cages under 180° C. in an argon atmosphere for 1 hour during the thin film processing. In some embodiments, EC layers are crosslinked with a linker. For example, ECP-magenta can be crosslinked with a crosslinker of bis(fluorophenyl azide) (bisFA). The linker is blended with ECP-magenta/chloroform solution in a 5 wt % ratio (linker:ECP-magenta) and treated by a 5 minutes ultraviolet (UV) light treatment after thin film process. The chosen crosslinking can promote the resistance of that particular electrochromic layer to the solvent for the subsequent thin film processes while not significantly affecting the crosslinked electrochromic layer's electrochromic and electrochemical properties for its designed application.

Crosslinking Condition Optimization and Impact Evaluation

The crosslinking efficiency can affect the degree of solvent resistance of an EC layer. The parameters which affect the crosslinking degree include crosslinker concentration and crosslinking time when a certain crosslinker is chosen. To explore the optimal crosslinking condition, the insoluble fraction is quantified to monitor the crosslinking efficiency. Insoluble fraction is determined by the maximal absorbance within visible light range before and after solvent washing of a particular EC layer and quantified in Equation 1.

Equation 1

$$\text{Insoluble fraction (\%)} = \frac{\text{Absorbance}_{max}\text{ after solvent dipping}}{\text{Absorbance}_{max}\text{ before solvent dipping}} \times 100\%$$

To demonstrate the way to investigate the optical crosslinking conditions, ECP-M is used as an example ECP for the EC layer to be crosslinked, and BisFA is used as an example crosslinker. Chloroform, which is a common polymer processing solvent, is used for testing the solvent resistance before and after crosslinking. UV light treatment after the thin film process is used for crosslinking. BisFA is blended with ECP-M/Chloroform solution with 0 wt % to 9 wt % of the linker (linker:ECP-M). The spin-cast film from the blends is exposed to UV light in a nitrogen atmosphere for a time range of 0-10 min to complete the crosslinking. Then, the crosslinked film is immersed in the chloroform for 5 minutes, followed by further chloroform washing.

Figure 3:
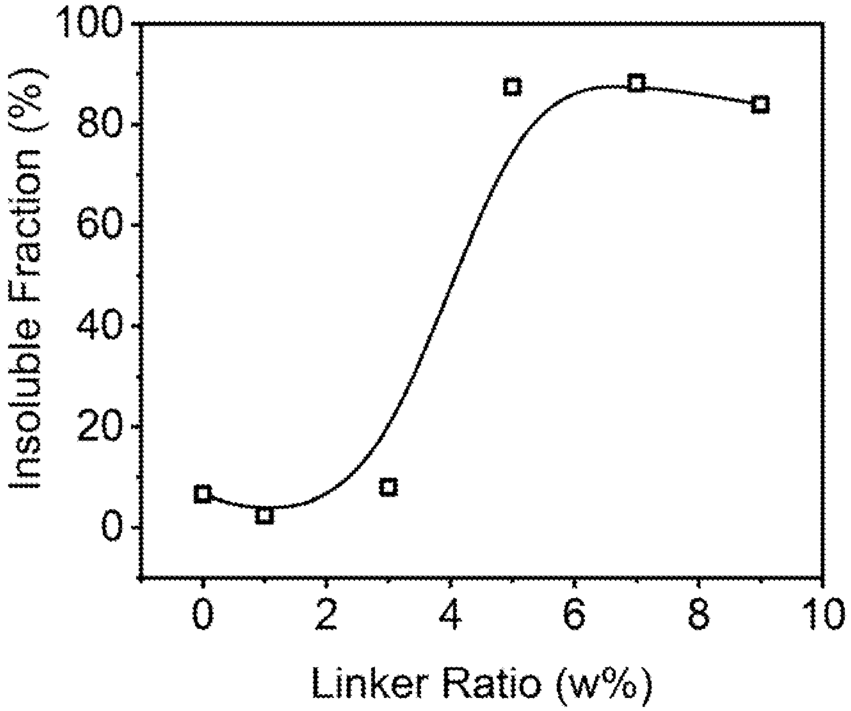
FIG. 3 is a diagram illustrating the insoluble fraction (%) of ECP-magenta (ECP-M) crosslinked with the crosslinker bis(fluorophenyl azide) (bisFA) at different linker weight percentages, according to various embodiments.
Figure 4:
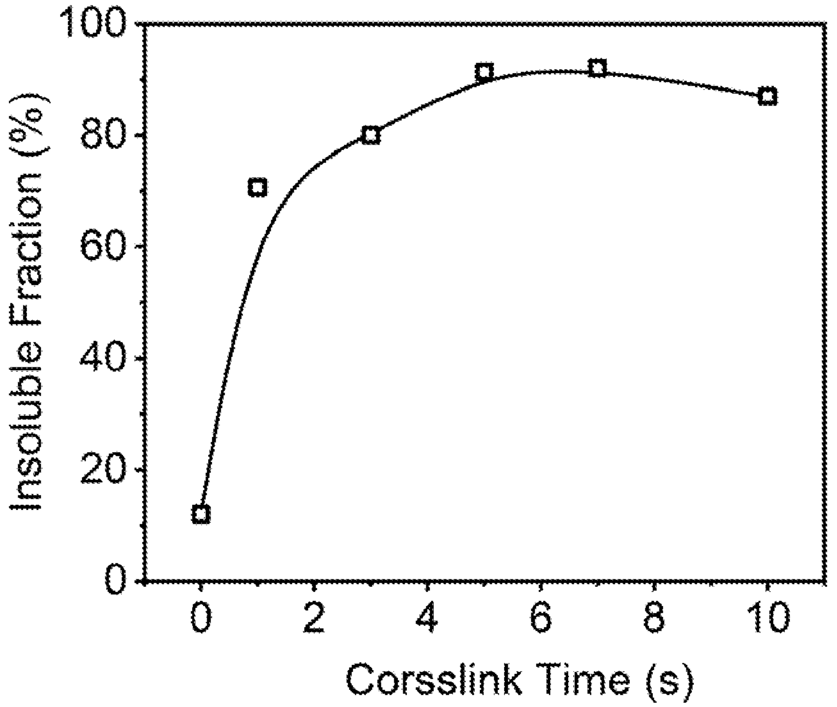
FIG. 4 is a diagram illustrating the insoluble fraction (%) of ECP-M crosslinked with the crosslinker bisFA after different crosslinking time, according to various embodiments.

Both crosslinker concentration and crosslinking time are investigated. As shown in FIG. 3, insoluble fractions (%) with different linker weight percentages are compared. When the linker weight percentage is less than 5%, the EC layer has a low insoluble fraction (<20%), and when the linker weight percentage is equal to or higher than 5%, the insoluble fractions reach the plateau of at least 85%. This indicates that for this system, the optimal linker weight percentage is 5 wt %. Insoluble fractions (%) with different UV treatment time are shown in FIG. 4. Insoluble fractions reach a plateau of at least 85% after 4 minutes of UV treatment. To avoid significant polymer conformation changes caused by extended UV treatment, an optimized crosslinking time of 5 minutes is chosen.

Figure 5:
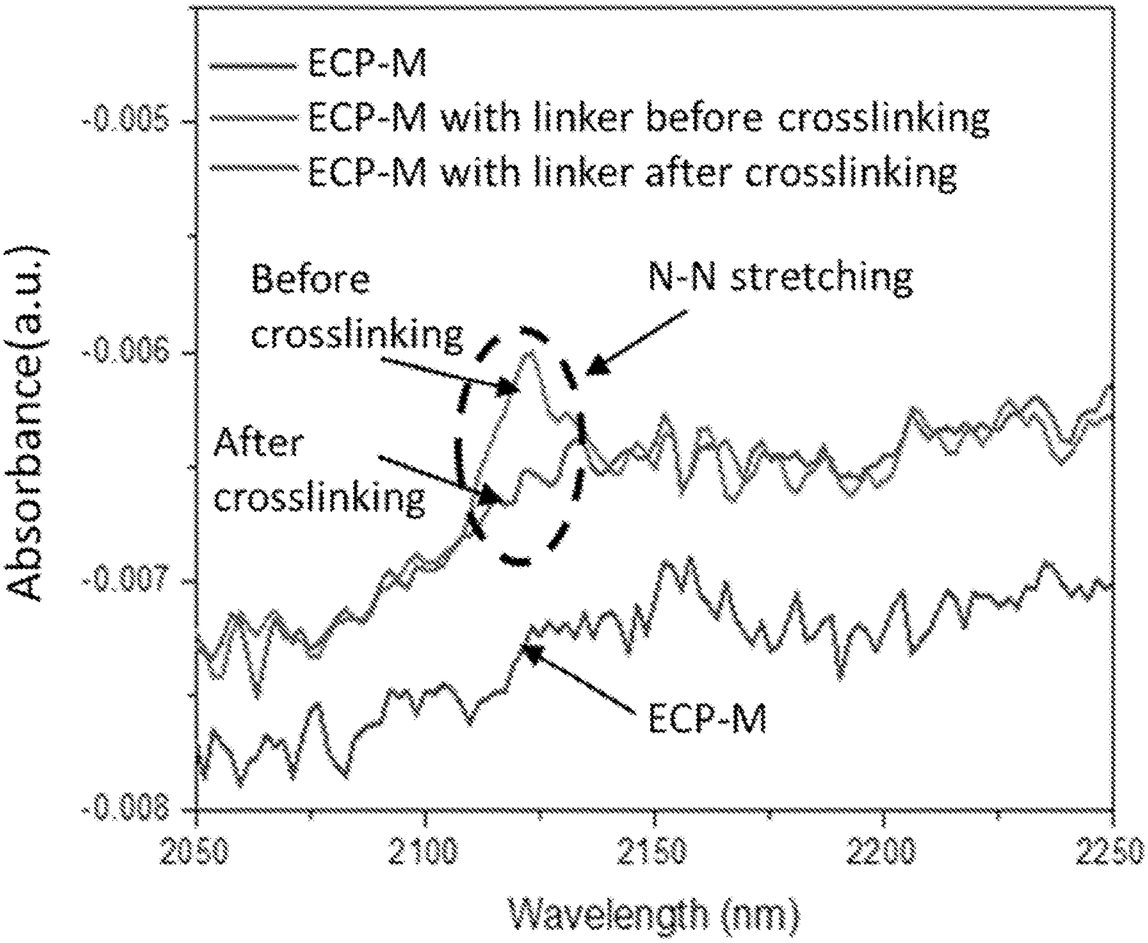
FIG. 5 is Fourier-transform infrared (FTIR) spectra of the ECP-M layer before and after crosslinking at wavelengths from 2050-2250 nm.

The successful crosslinking of the ECP-M layer is further confirmed by comparing the FTIR spectra before and after crosslinking by the optimized conditions with the example crosslinker bisFA (5 wt % crosslinker with UV treatment for 5 minutes). As shown in FIG. 5, the loss of $N_3$ (N—N stretching) indicates the successful crosslinking within the ECP-M layer.

Figure 6A:
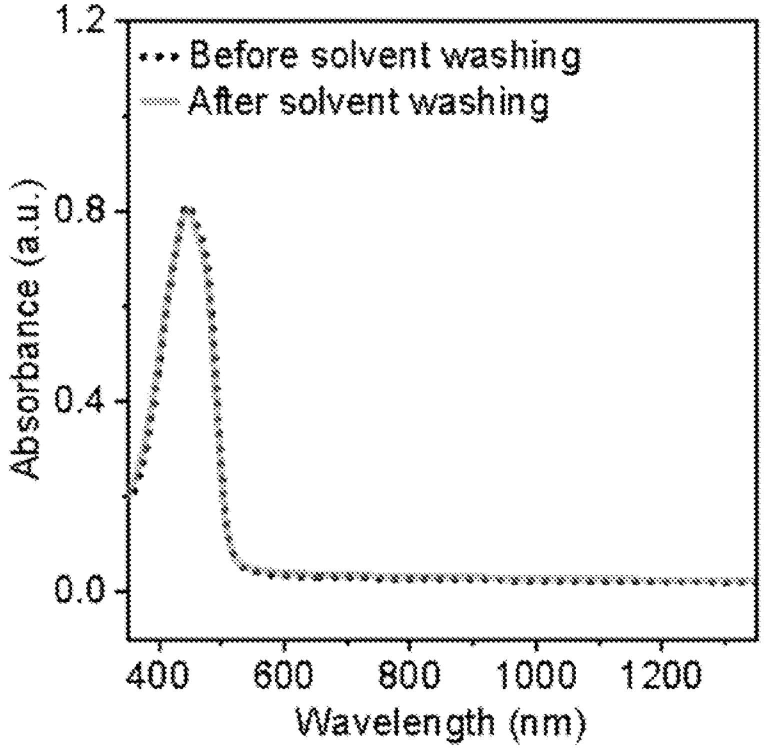
FIGS. 6(A)-(B) are absorbance spectra of crosslinked ECP-yellow (ECP-Y) (FIG. 6(A)) and ECP-cyan (ECP-C) (FIG. 6(B)) before and after chloroform washing.
Figure 6B:
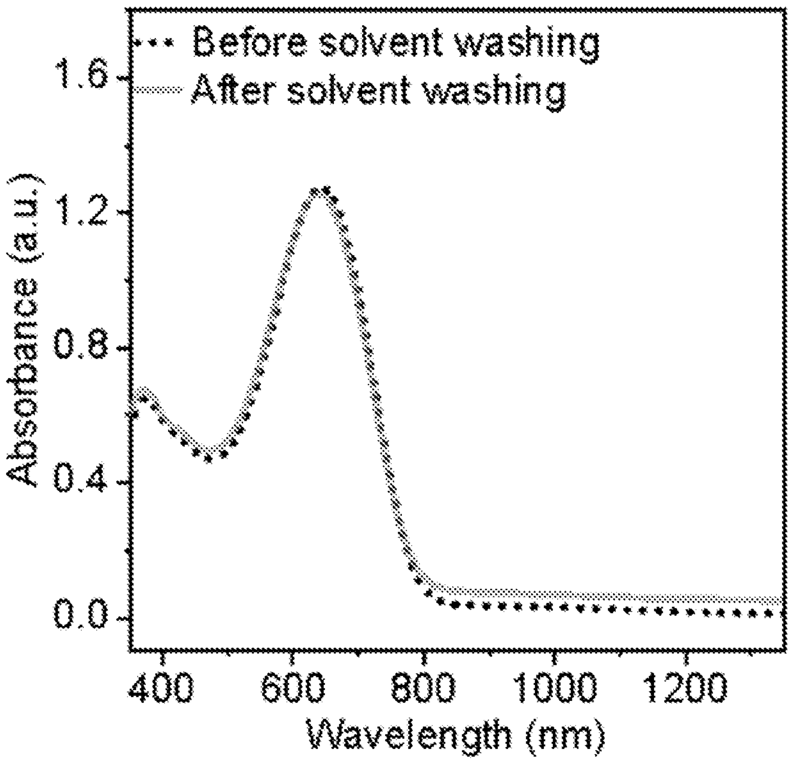
Figure 7A:
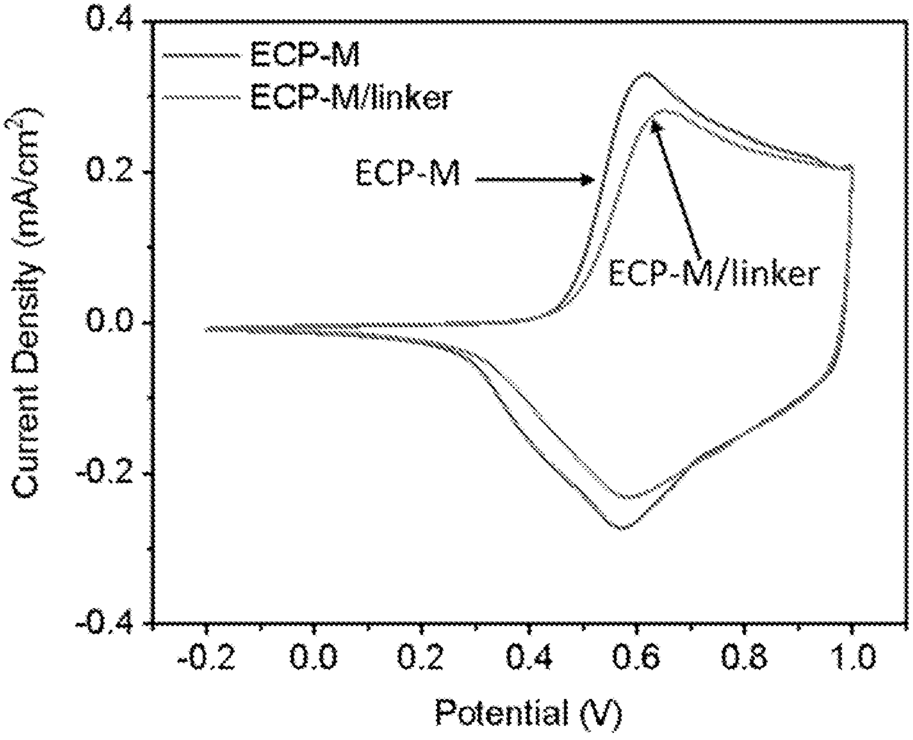
FIGS. 7(A)-(D) show the optical and electrochemical performances of example ECP-M layers with and without optimized crosslinking.
Figure 7B:
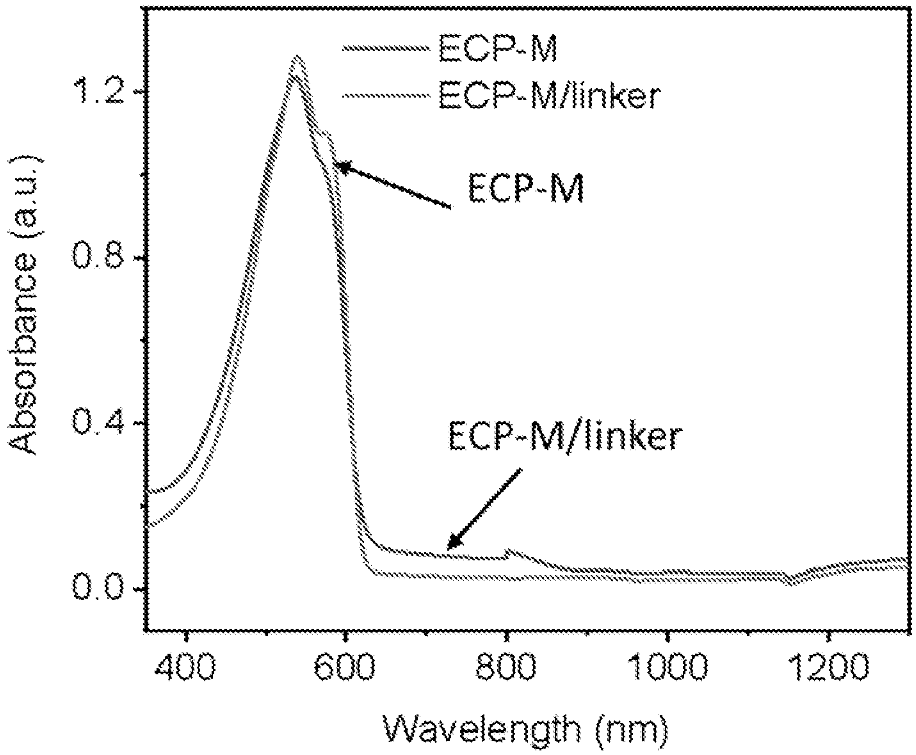
Figure 7C:
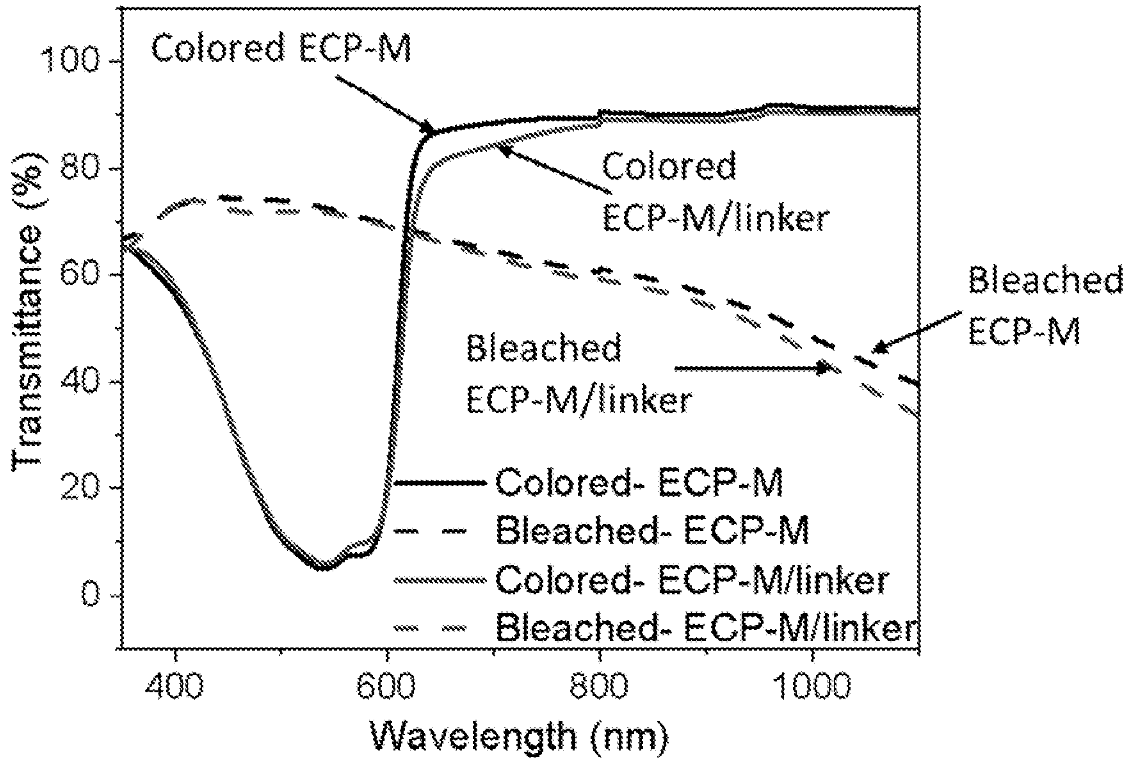
Figure 7D:
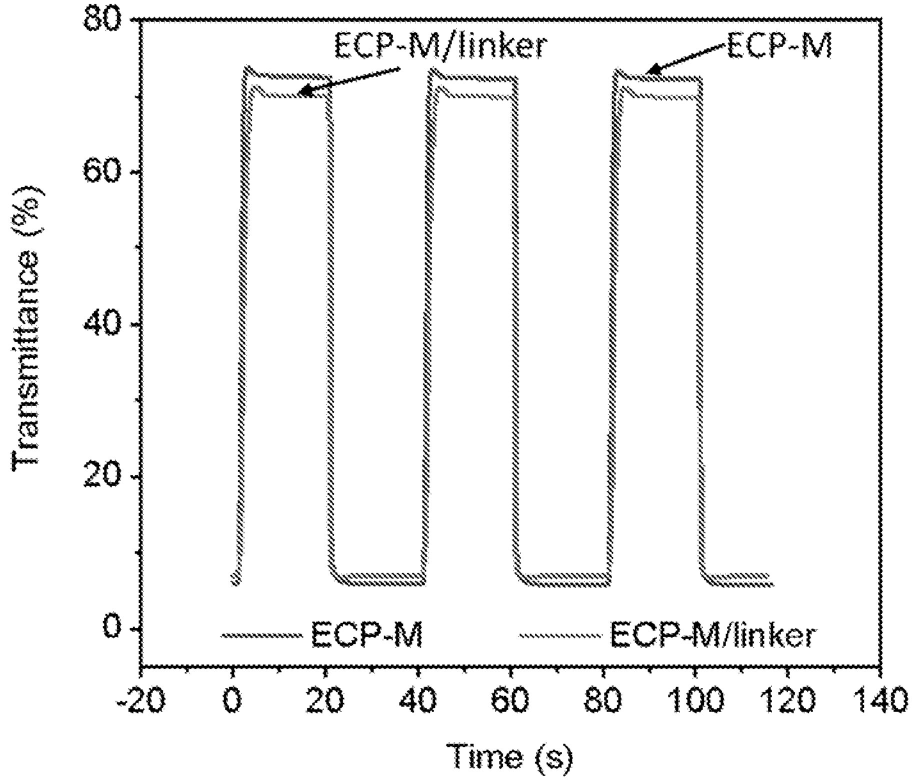
Figure 8A:
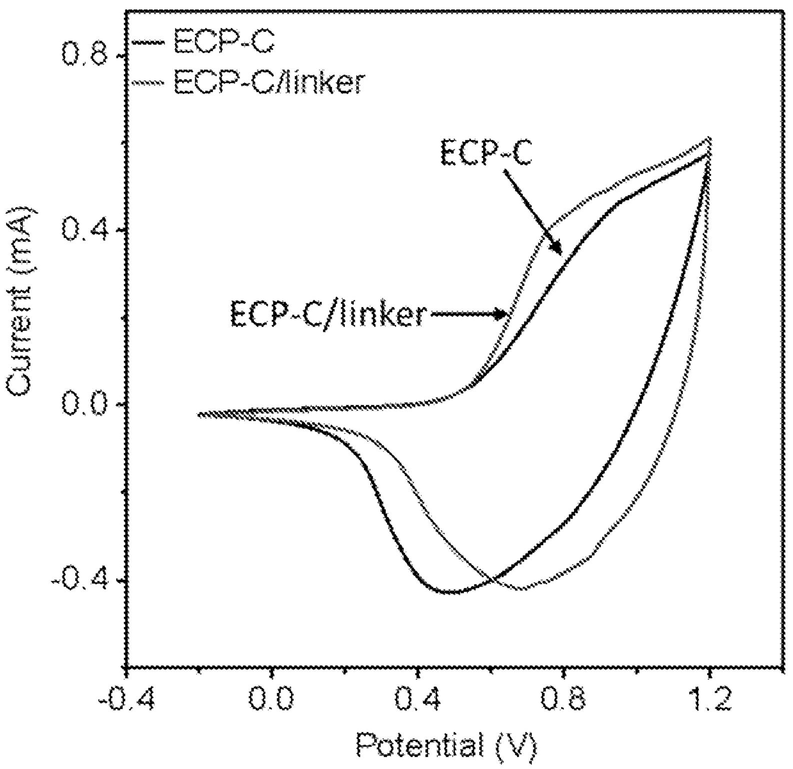
FIGS. 8(A)-(C) show the optical and electrochemical performances of example ECP-C layers with and without optimized crosslinking.
Figure 8B:
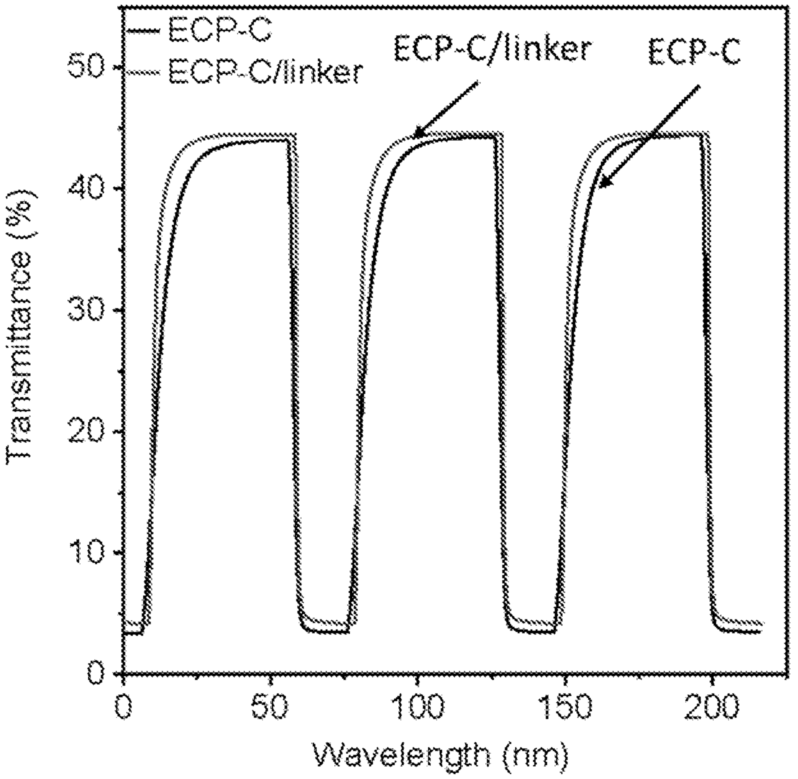
Figure 8C:
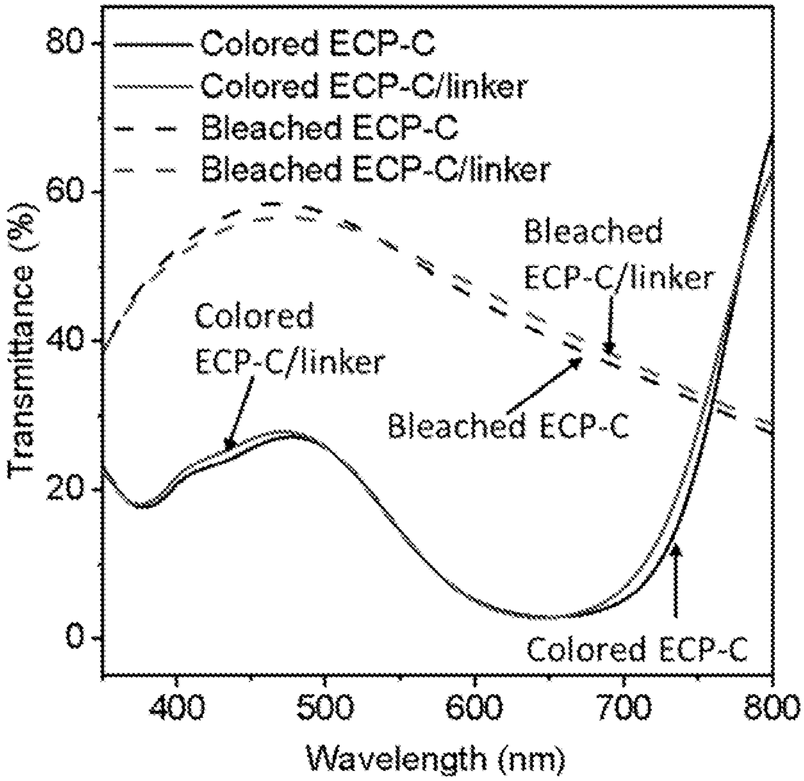
Figure 9A:
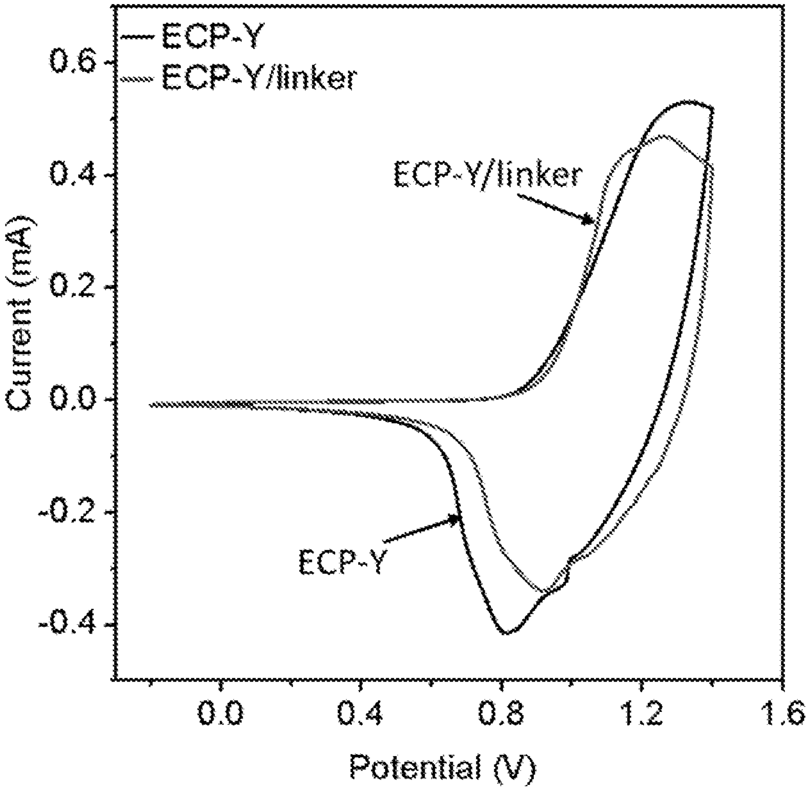
FIGS. 9(A)-(C) show the optical and electrochemical performances of example ECP-Y layers with and without optimized crosslinking.
Figure 9B:
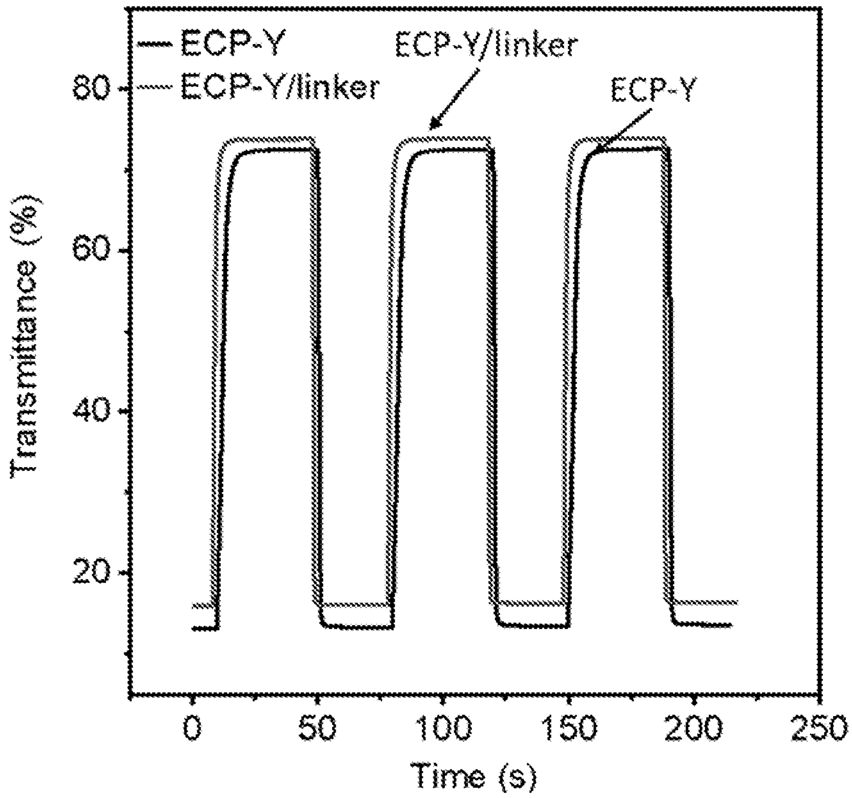
Figure 9C:
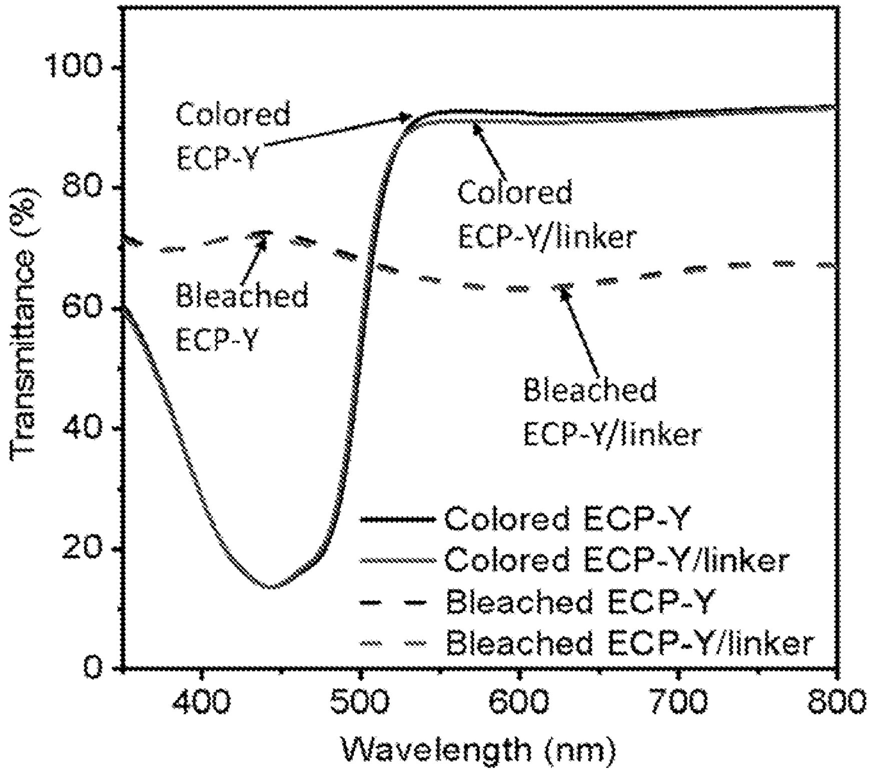

The same optimal crosslinking conditions can be applied to prepare other crosslinked electrochromic materials, for example, ECP-C as shown in FIG. 6(A) and ECP-Y as shown in FIG. 6(B). More than 98% of insoluble fractions are obtained for both ECP-C and ECP-Y after crosslinking with 5 wt % bisFA and UV treatment for 5 minutes.

Crosslinking has insignificant impacts on the electrochromic and optical performances of the crosslinked electrochromic layer. As shown in FIG. 7(A)-(D), compared with pure ECP-M, the crosslinked ECP-M exhibits almost identical CV, absorbance at a colored state, full-wavelength transmittance at both colored and bleached states, optical contrast (transmittance difference at 550 nm between colored and bleached states of ECP) while remaining similar switching kinetics. The same insignificant impact of crosslinking is also demonstrated by other two primary ECPs (ECP-C and ECP-Y), as shown in FIGS. 8(A)-(C) and FIGS. 9(A)-(C) under optimized crosslinking conditions.

Optical Prediction

Figure 10:
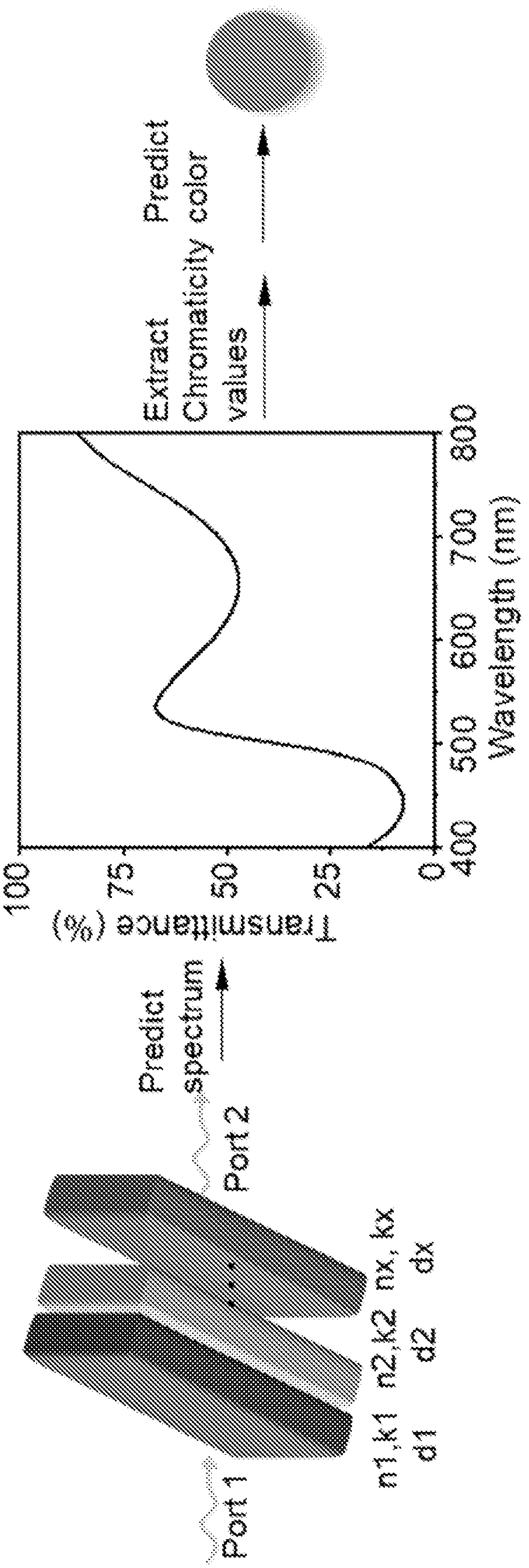
FIG. 10 illustrates a workflow scheme of an optical modeling for multilayer ECP stackings, according to one example embodiment.

The insignificant impact of crosslinking on the electrochromic and optical performance of the crosslinked EC layer makes the modeling and prediction of spectroscopic properties and color appearances of each EC layer possible. Thus the optical properties of stacking EC layers are predictable, providing guidance for potential ECD design and preparation. The workflow of the optical modeling for the disclosed electrochromic device is shown in FIG. 10. A multilayer geometry with a high width-to-thickness ratio is built to simulate the multilayer stacking ECP thin films. Depolarized electromagnetic waves with the wavelength from 400 to 800 nm in the step of 10 nm are applied normally to the geometry from top to bottom. Intrinsic values of each polymer—refractive index, extinction coefficient, and thickness—are applied respectively to each layer of the model to study the interaction between electromagnetic waves and the polymer stacking system. The transmittance or reflectance spectra can be derived from the study results, whereby the chromaticity values are extracted to predict the color appearance of the system.

Figure 11A:
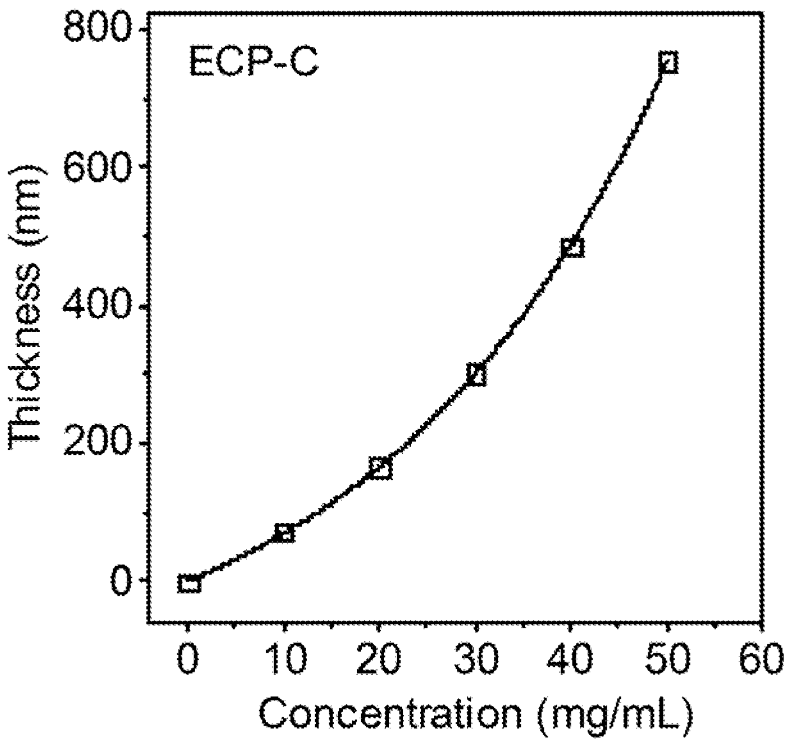
FIGS. 11(A)-(C) are diagrams illustrating the correlations between thicknesses and concentrations for ECP-C (FIG. 11(A)), ECP-M (FIG. 11(B)), and ECP-Y (FIG. 11(C)), according to various embodiments.
Figure 11B:
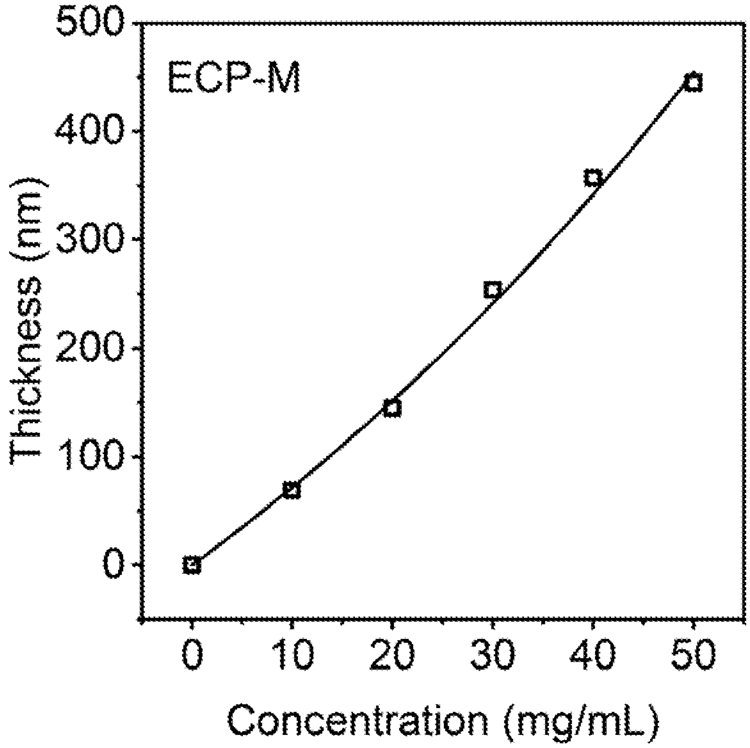
Figure 11C:
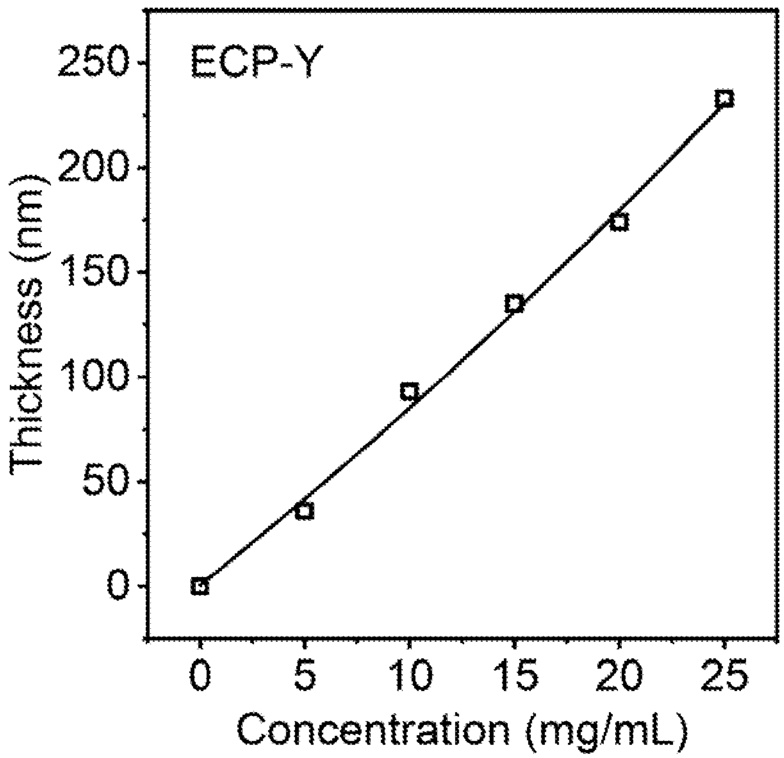
Figure 12A:
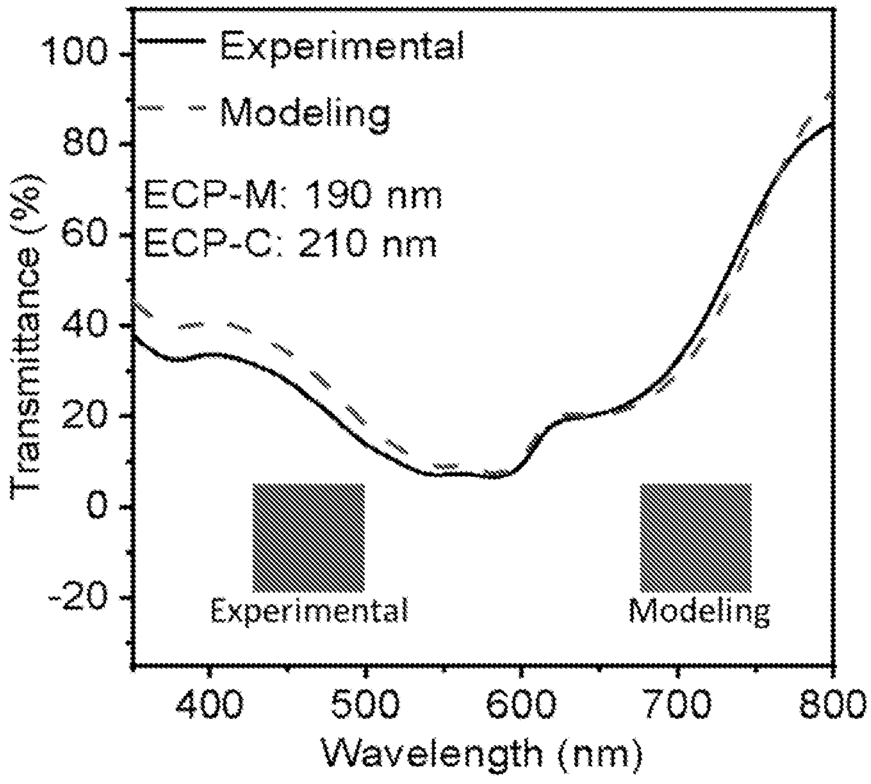
FIGS. 12(A)-(C) contain the experimental vs. modeling spectra of a double-layer ECP stackings with various polymer thicknesses, according to various embodiments.
Figure 12B:
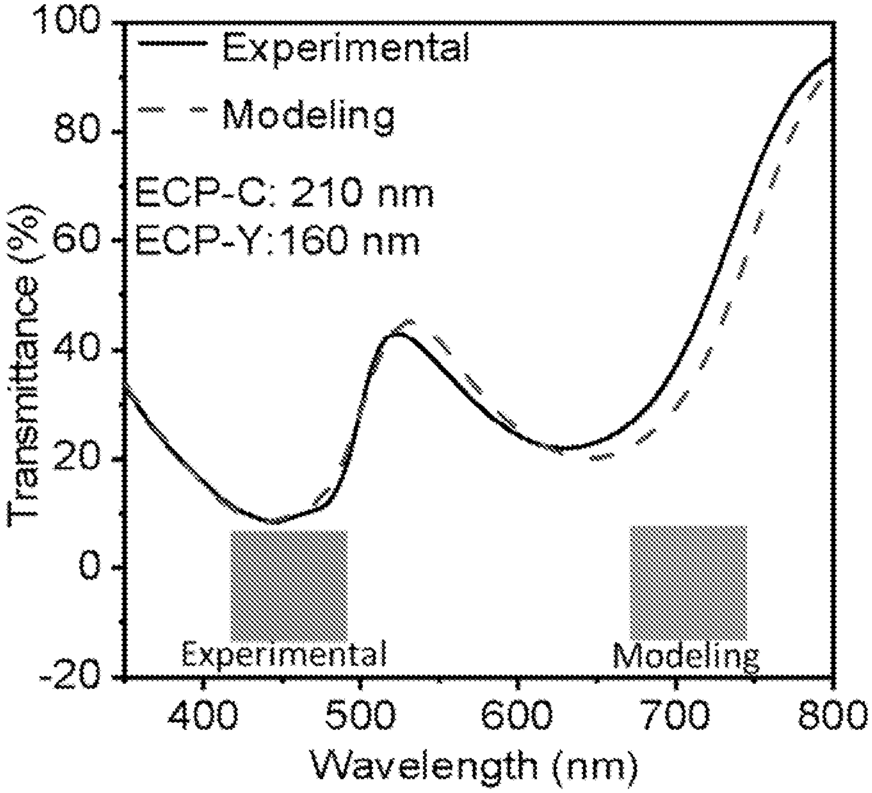
Figure 12C:
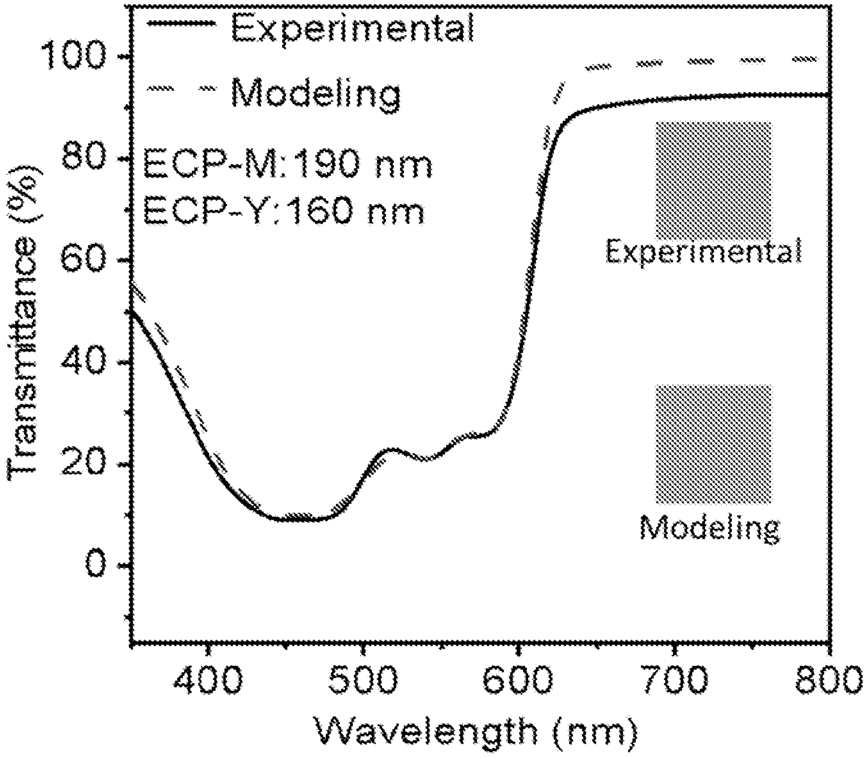
Figure 13A:
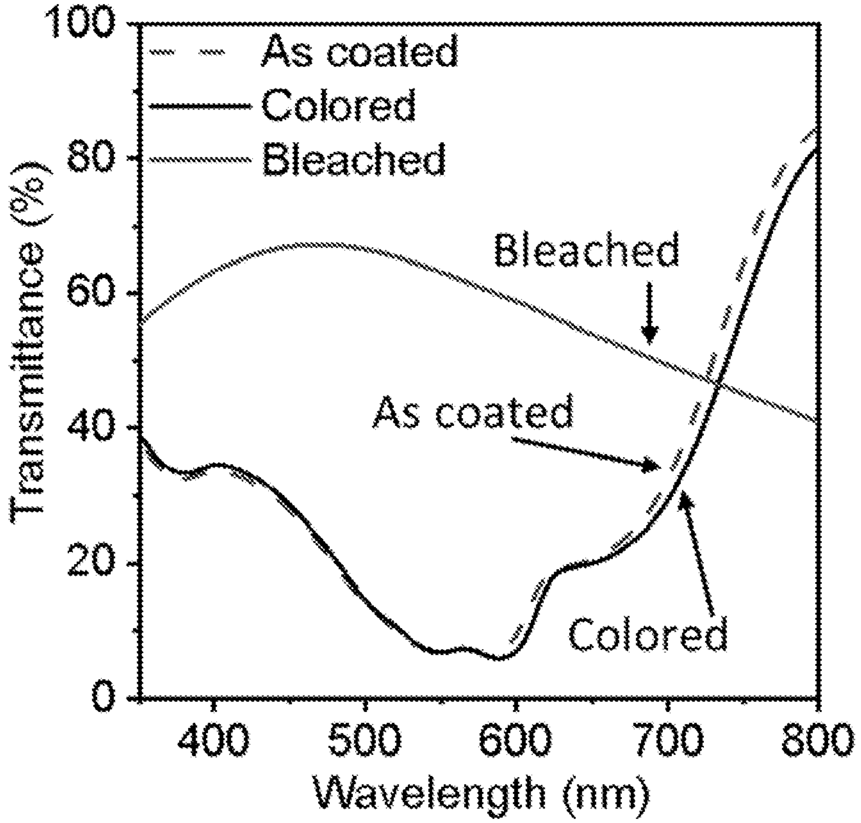
FIGS. 13(A)-(C) contain transmittance spectra of recreated double-layer ECP stackings produced by experiments, according to various embodiments.
Figure 13B:
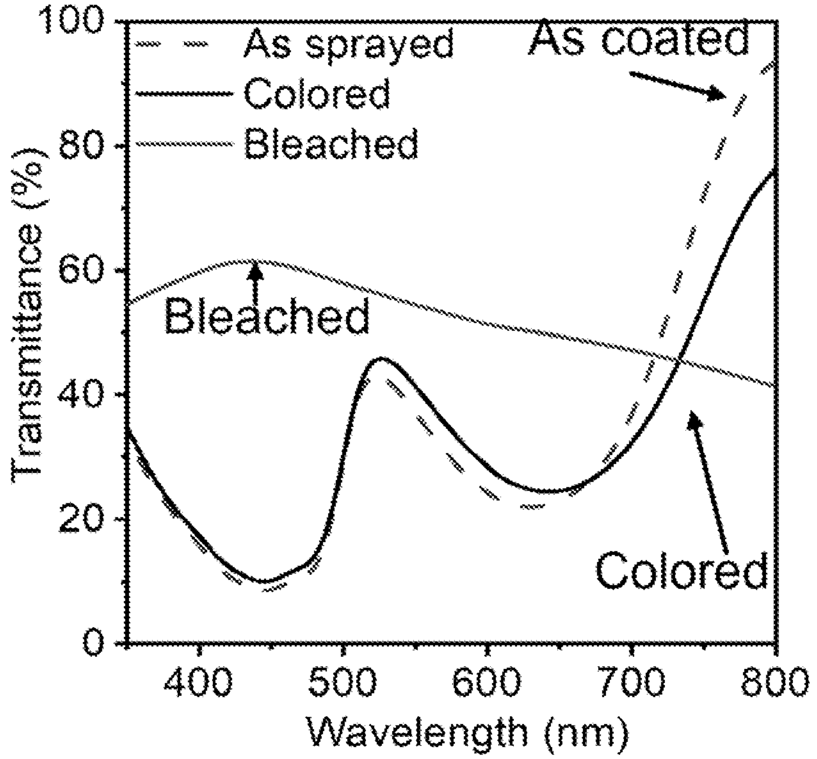
Figure 13C:
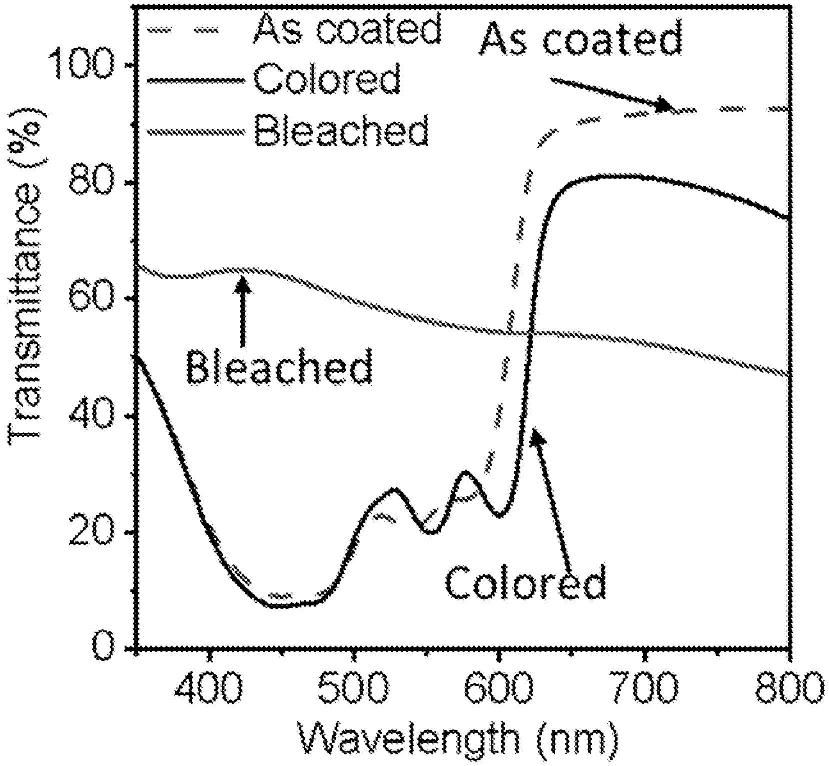

To confirm the predicted results can match well with the experimental results, optical modeling of double-layer stacking ECP thin films at colored states is performed. Since concentration is controllable during the coating process, the relationship between thickness and concentration (as shown in FIGS. 11(A)-(C)) is used to generate the thickness required for the modeling. ECP-C, ECP-M, and ECP-Y are used here as example ECPs for modeling. Note that the concentration-thickness relationship varies even for ECPs with the same formula but different molecular weight. Three ECPs are combined in pairs, generating three double-layer stacking scenarios in the simulation, as shown in FIGS. 12(A)-(C). 210 nm, 190 nm, and 160 nm thicknesses are used for ECP-C, ECP-M, and ECP-Y, respectively. Based on the computational results, transmittances of three double-layer ECP stacking thin films are derived and shown by dashed-line curves in FIGS. 12(A)-(C). Based on the experimental results, observed transmittance spectra of the double-layer ECP stacking thin films are shown in solid-line curves in FIGS. 12(A)-(C). Remarkably, they are in excellent agreement with modeling values (dashed-line curves), indicating the validation of the modeling. Also shown in FIGS. 12(A)-(C), the colors from both the experimental and the modeling spectra are quite similar. As shown in FIGS. 13(A)-(C), the recreated double-layer ECP stacking thin films show transmittance change between reduced (colored) and oxidized (bleached) states, demonstrating that the double-layer ECP stacking thin films present great electrochromic performances. Break-in effect can be observed for these three recreated stacking electrochromic films after a few oxidized and reduced cycles. This break-in effect is predictable using the optical properties values of the break-in film by optical modeling (data not shown).

The successful optical modeling can be used to guide the design of ECDs with a specific color appearance by changing the input parameters, including parameters about materials (e.g., refractive index, extinction coefficient, etc.), and film thicknesses for each layer. The structure of electrochromic material determines the neutral color to be displayed. The thickness of each EC layer can control the saturation of color for each layer. Therefore, by adjusting electrochromic materials and thickness for each layer, an ECD with multiple EC layers disclosed herein produces various colors that are difficult to be produced for an ECD with only one single EC layer. As shown by various double-layer ECP stacking thin films in FIGS. 14(A)-(I), each thin film is made by stacking an underlying crosslinked EC layer and a top EC layer with different thicknesses controlled by different concentrations. By varying different ECPs and different thicknesses for each layer, various colors can be achieved even for double-layer thin film systems. The thickness is controlled by concentration of the ECP solution. The higher concentration yields the greater thickness. ECPs with same formula but different molecular weights may have different concentration-thickness relationships, so the concentration values in one specific embodiment may not be able to be directly applied to another embodiment. ECDs with more EC layers are expected to produce much richer colors. For example, each double-layer ECP stacking thin film shown in FIGS. 14(A)-(C) has an underlying ECP-C layer and a top ECP-Y layer, with different thicknesses, the obtained color varies from seaweed green in FIG. 14(A) to forest green in FIG. 14(B) to lime green in FIG. 14(C). Each double-layer ECP stacking thin film shown in FIGS. 14(D)-(F) has an underlying ECP-C layer and a top ECP-M layer with different thicknesses, showing different colors. Each double-layer ECP stacking thin film shown in FIGS. 14(G)-(I) has an underlying ECP-Y layer and a top ECP-M layer with different thicknesses, showing different colors.

A broadly absorbing black color is one of the widely accepted colors in the industries for various applications. In some embodiments, the black color can be produced by three different EC layers, including one layer of ECP-C, one layer of ECP-M, and one layer of ECP-M with at least two EC layers closer to an electrode are crosslinked. Since the sum of these three colors (cyan, yellow, and magenta) well covers the entire spectrum, the ECD's integrated color appears black. No matter the relative positions between the three layers, this ECD displays black with minor variations. Meanwhile, by adjusting the applied voltage and thickness, different degrees of black can be achieved.

Figure 15A:
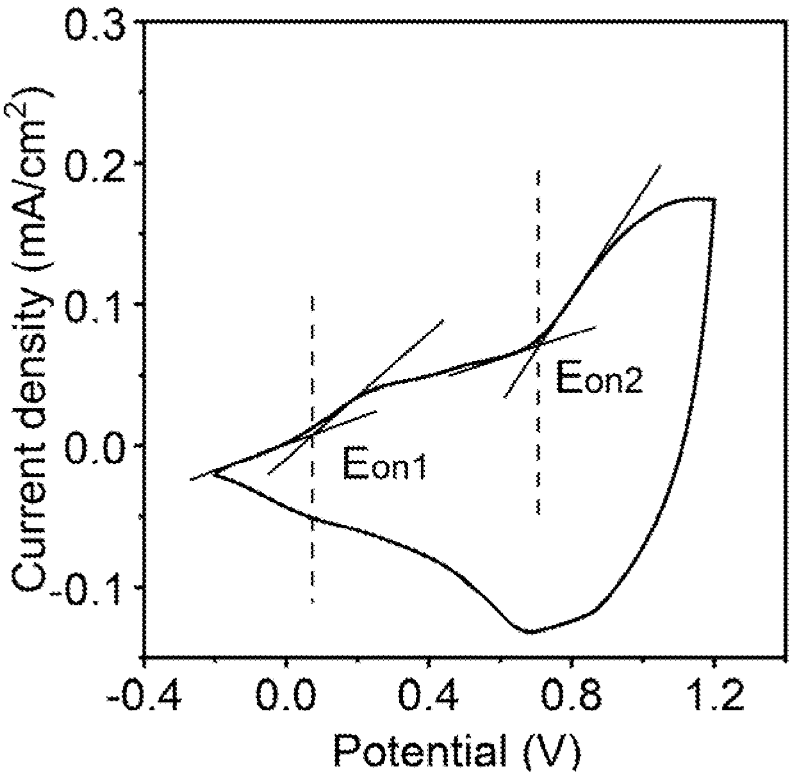
FIGS. 15(A)-(B) illustrate cyclic voltammetry data, according to various embodiments.
Figure 15B:
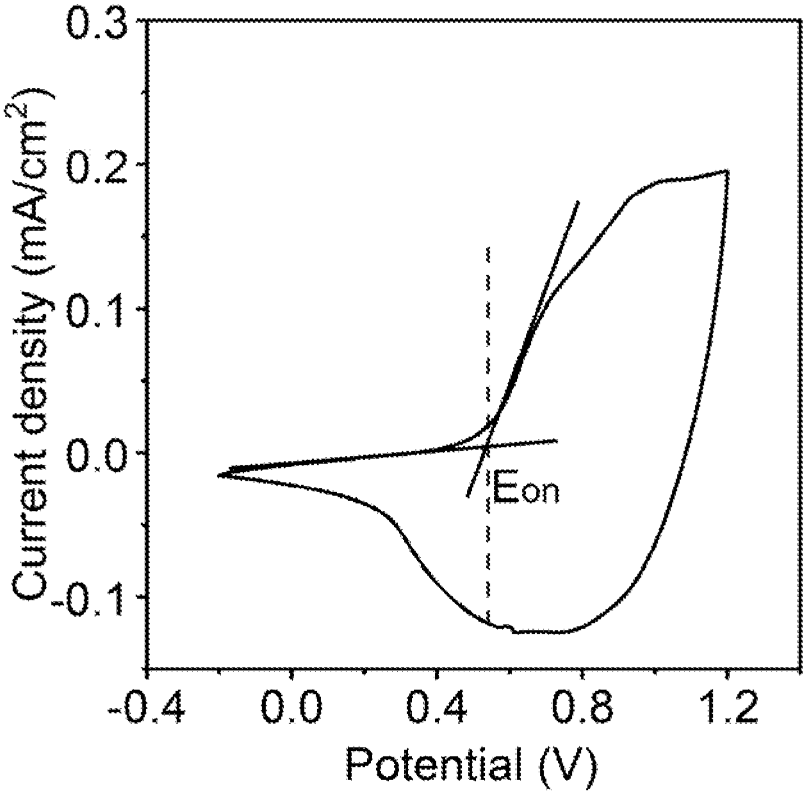
Figure 16A:
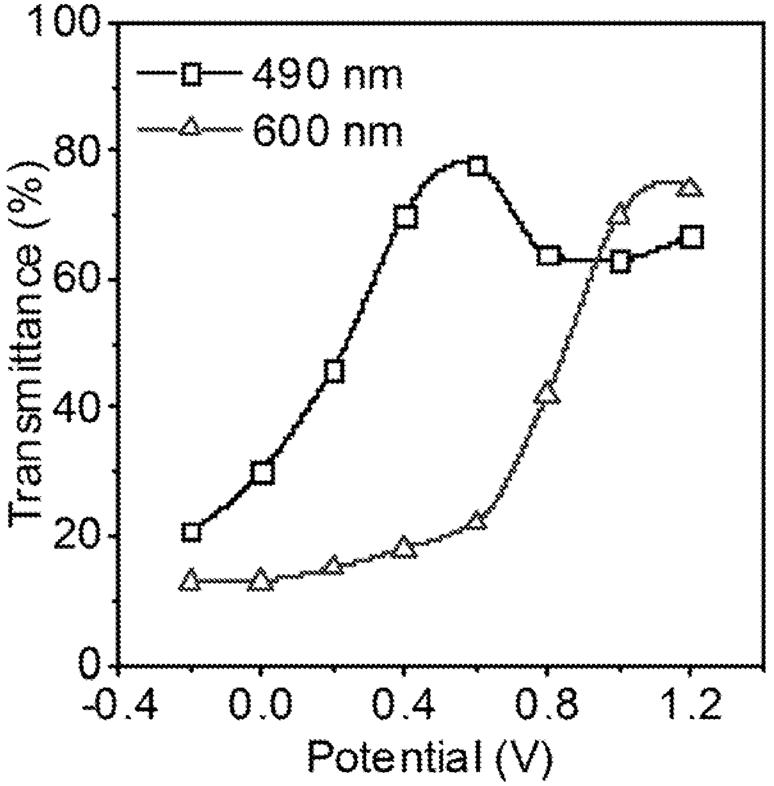
FIGS. 16(A)-(B) illustrate transmittance evolution data monitored at 490 nm and 600 nm as a function of applied voltages, according to various embodiments.
Figure 16B:
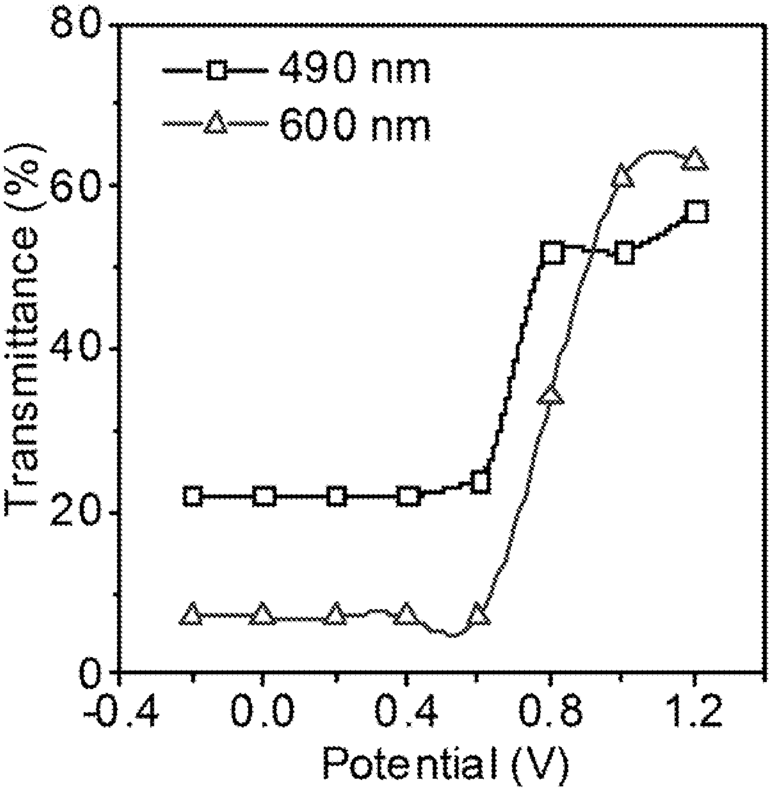

Due to the disparity of electrochromic onset potentials of constituent ECPs, conventional polymer blending method cannot avoid an intermediate color during switching. However, the ECDs disclosed herein can minimize an intermediate color. As shown in FIG. 15(A), when two ECPs (ECP-orange and ECP-blue) are blended together, ECP-blue has a lower electrochromic onset potential, thus it gets oxidized first. The asynchronous doping process bleaches the lower onset potential EC-blue layer before the higher onset potential EC-orange layer, leading to an intermediate color. As a result, the cyclic voltammetry of the film presents two separate electrochemical onset potentials at around 0 V and 0.7 V (FIG. 15(A)), indicating a split electrochemical doping and the presence of an intermediate color. However, the disclosed ECD displays only one single electrochemical onset potential at around 0.58 V, indicating a synchronized electrochemical reaction and color change, thus leading to minimized intermediate color, as shown in FIG. 15(B). When two ECPs are stacked with ECP-orange on top, electrons will be injected from ECP-blue/ITO electrode interface while ions diffuse from ECP-orange/electrolyte interface under a positive potential. Only when the ECP-orange is doped, the diffusion of the ions will become unimpeded and get into ECP-blue to complete doping of the stacking. The spectroelectrochemical performances at the wavelength of 490 nm and 600 nm, which are the maximum absorbance peaks of ECP-blue and ECP-orange respectively, as a function of applied voltages are shown in FIG. 16. Unlike conventional polymer blending (as shown in FIG. 16(A)), for the disclosed ECD, the transmittances at 600 nm and 490 nm almost increase simultaneously at 0.6 V for electrochromic stacking, suggesting a unified color change (shown in FIG. 16(B)). Therefore, the intermediate color can be minimized.

Embodiment 1: Three-Layer ECP Stacking Black Color Thin Film with a Minimized Intermediate Color Black electrochromic materials have aroused great interest due to their wide applications. Neutral grey is the purest black, which contains approximately equal amounts of spectrum colors. According to the CMY color model, when ECP-C, ECP-M, and ECP-Y are mixed and have the same color contributions, their mixture will display neutral grey. However, since these three types of ECPs have distinct absorption coefficients, the ratio of their thicknesses must be carefully tuned to obtain neutral grey, which conventionally necessitates dedicated experimental labor.

In some embodiments, neutral grey color can be obtained by stacking ECP-C, ECP-M, ECP-Y with an appropriate thickness ratio. Optical modeling indicates that when the film thicknesses of ECP-C, ECP-M, ECP-Y are 250, 80, and 100 nm, respectively, the maximum absorbance intensities of three ECPs are almost identical, suggesting a neutral grey color. The actual thickness may not be the exact number for each layer, but it needs to be the same ratio for the thicknesses of three EC layers of 25:8:10. By varying the actual thickness while maintaining the same ratio, lighter or darker shades of neutral grey/black color are produced.

Figure 17A:
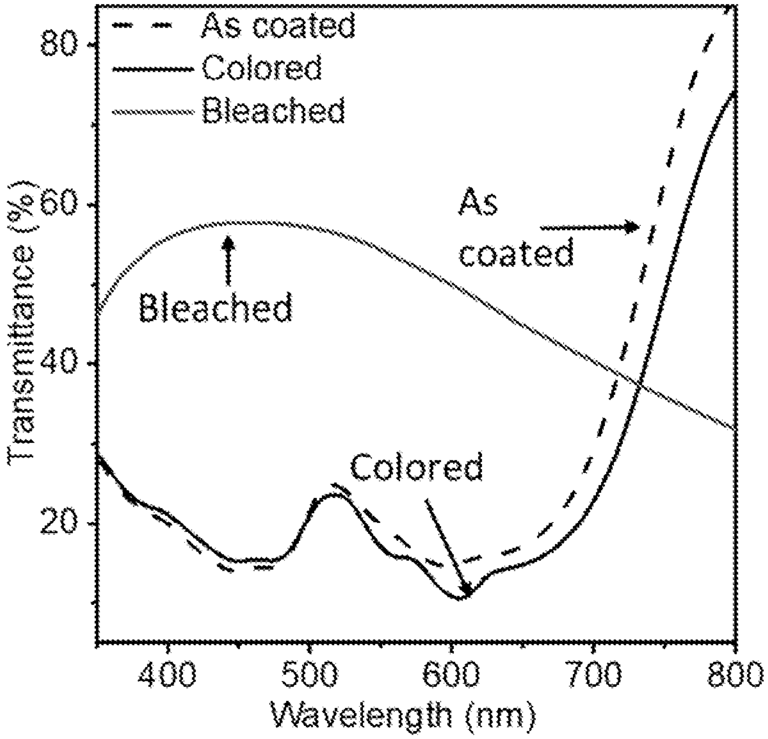
FIGS. 17(A)-(B) are data of an example black color thin film from a triple-layer ECP stacking, according to various embodiments.
Figure 17B:
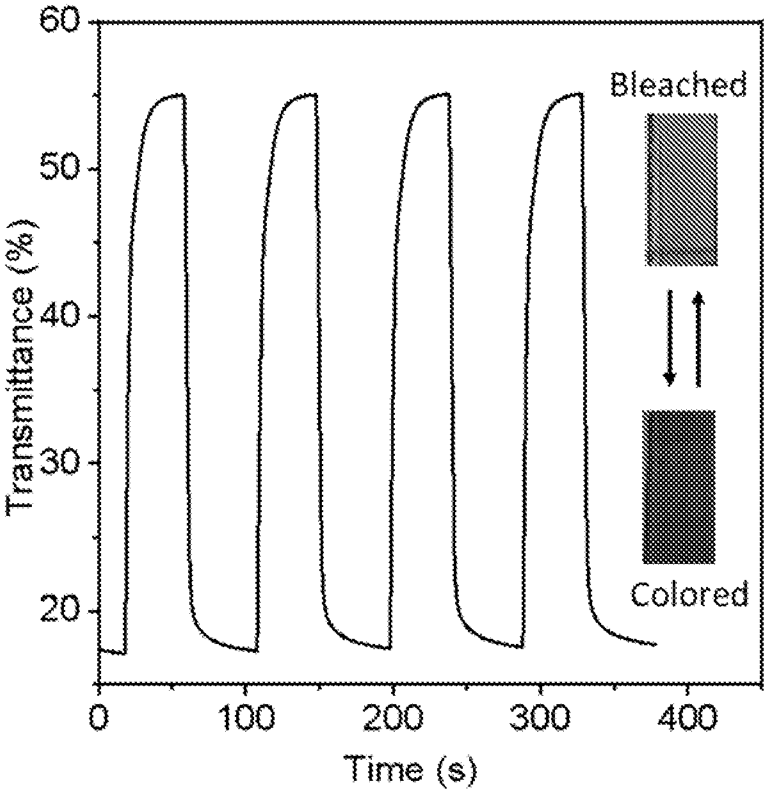

Guided by the modeling and the concentration-thickness correlation, a triple-layer ECP stacking thin film with neutral grey color is prepared by depositing three polymers in the sequence of ECP-C/ECP-Y/ECP-M from bottom to top on the ITO/glass from their chloroform solutions with concentrations of 26 mg/mL, 11 mg/ml, and 12 mg/mL, respectively. The spectroelectrochemical and the double potential step chronoabsorptometry measurements of the stacking polymers are shown in FIG. 17(A) and FIG. 17(B). The successful and stable color changing between neutral grey color and transparent is demonstrated. This triple-layer ECP stacking thin film shows 38% of optical contrast at 555 nm between colored and bleached states, with a switching time of 9 s.

Embodiment 2: ECD with Multilayer Electrochromic Patterns and Layered Textures

The present disclosure is also related to a device incorporating the disclosed electrochromic device. Besides facilitating color palettes construction and controlling intermediate colors, the ECP stacking technique opens up an avenue for developing ECP patterns with layered textures, leading to various potential applications, such as delicate optoelectronic display and counterfeiting labeling.

Figure 18A:
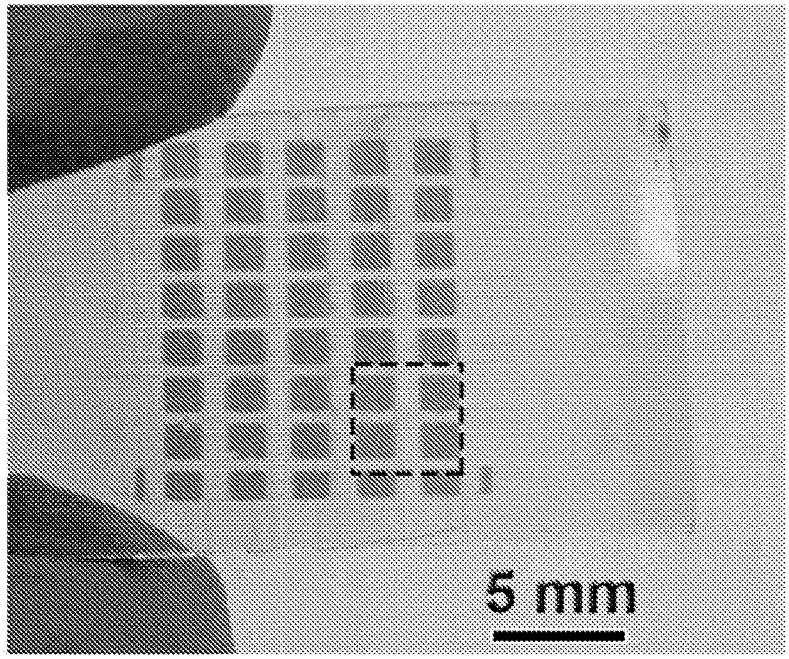
FIGS. 18(A)-(B) are data of an example multilayer electrochromic pattern with layered textures.
Figure 18B:
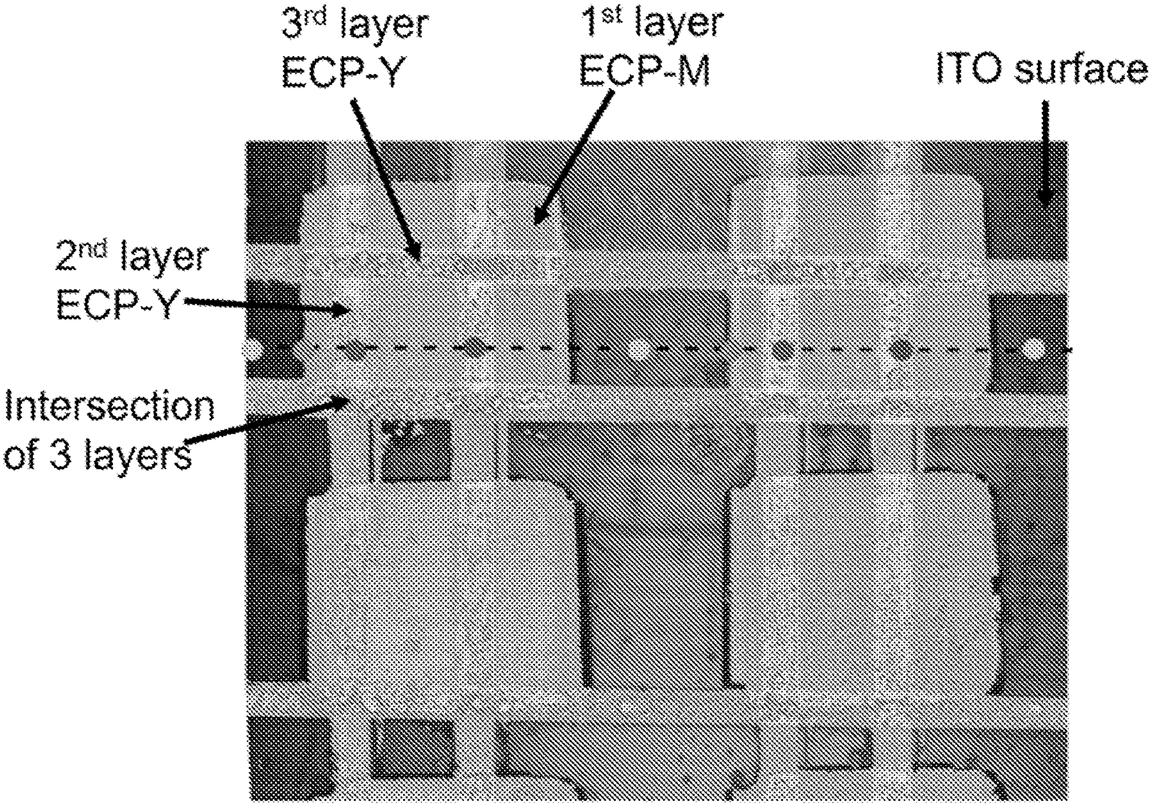
Figure 18C:
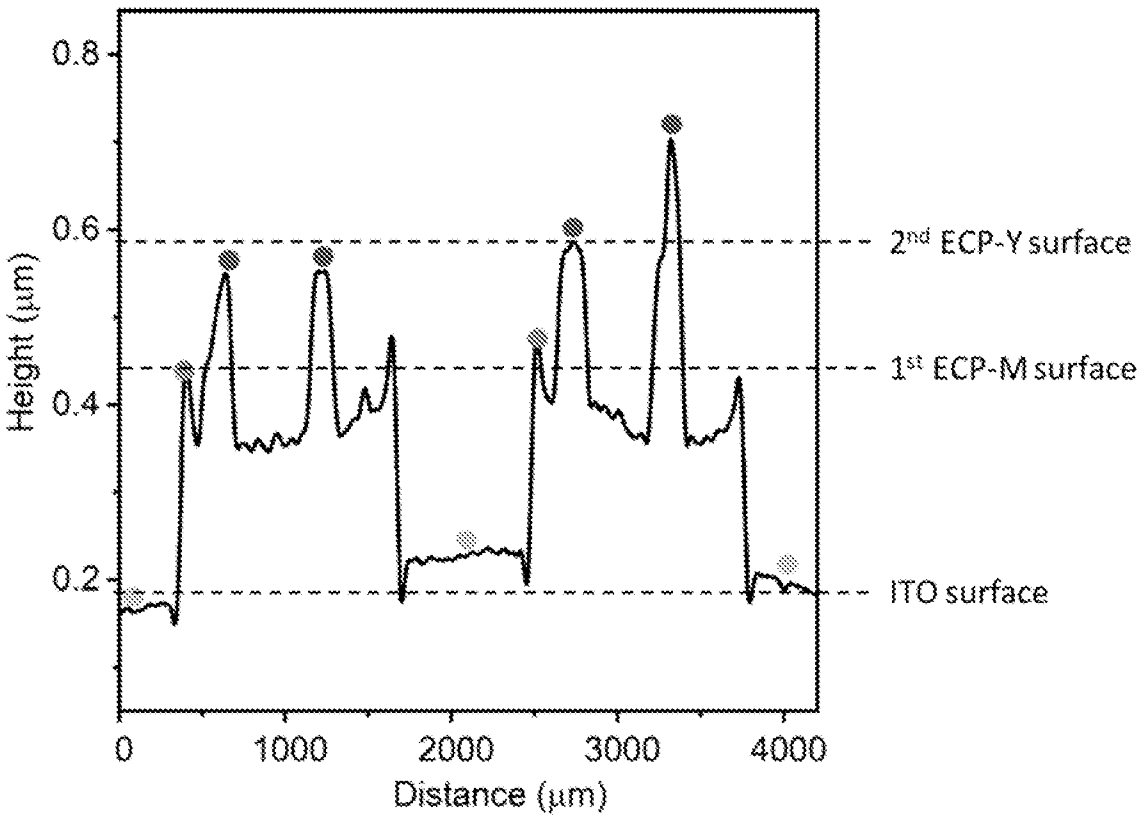
FIG. 18(C) is an extracted profile specifying the height change along the dashed line shown in FIG. 18(B).
Figure 19A:
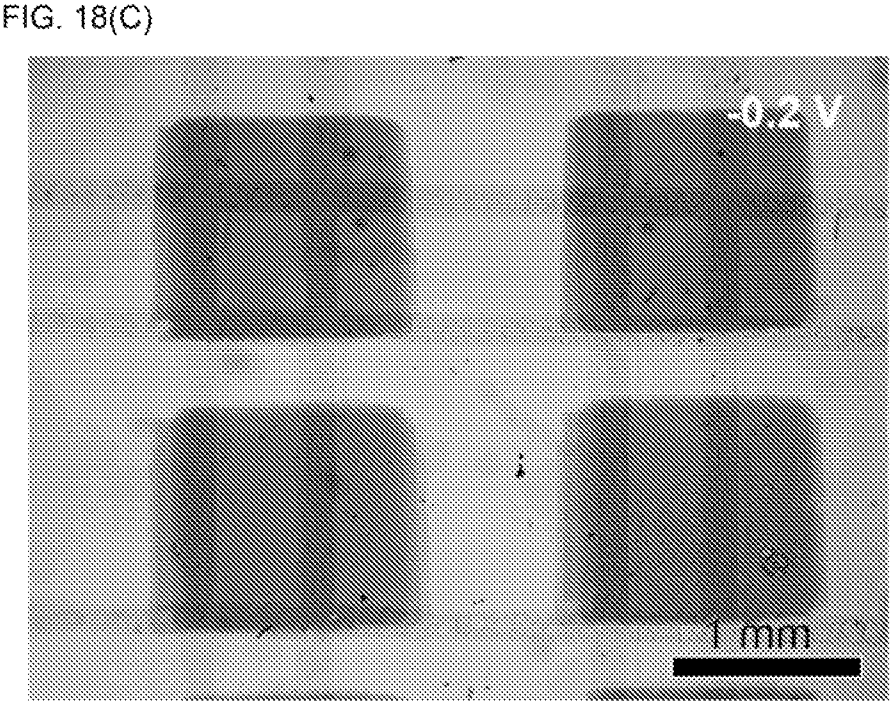
FIGS. 19(A)-(B) are optical microscopy images showing electrochromism of example multilayer electrochromic patterns with layered textures under different applied voltages.
Figure 19B:
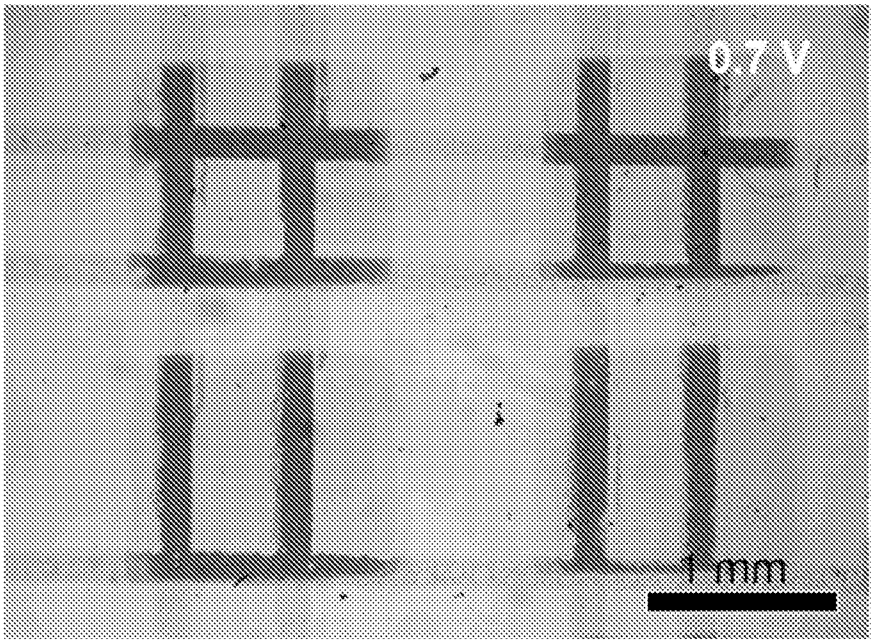
Figure 19C:
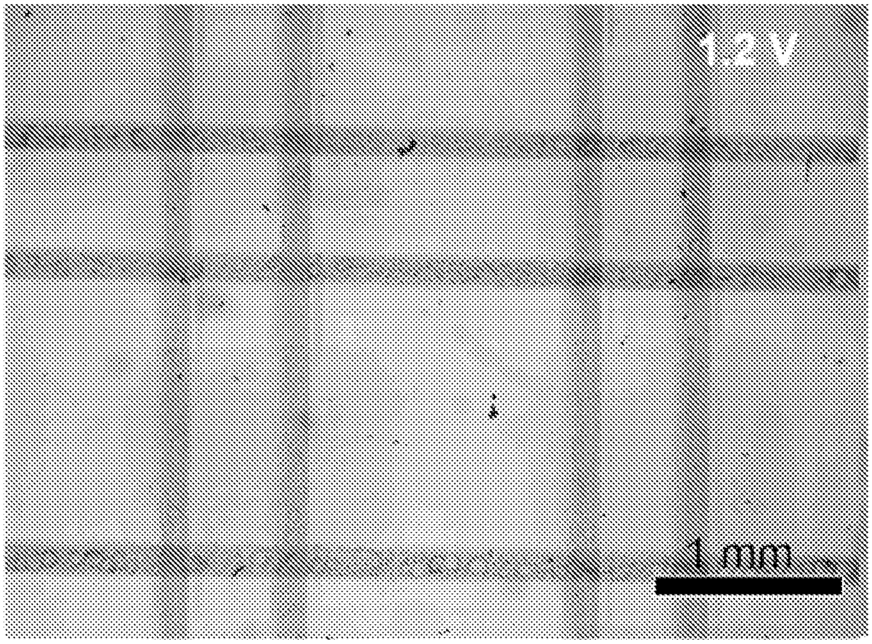
FIG. 19(C) is under 1.2 V.

In some embodiments, the device comprises multilayer electrochromic polymer patterns with surface texture information. A multilayer ECP pattern is constructed by combining the ECP stacking technique with photolithography to produce the surface texture information. As shown in FIG. 18(A), this multilayer ECP pattern has ECP-M rectangles as the bottom layer, vertical ECP-Y lines in the middle, and one layer of horizontal ECP-Y lines on the top. So the interactions of two ECP-Y lines and ECP-M rectangles are triple-layer ECP stackings. Specifically, the magenta rectangles patterns are first printed by covering spin-coated ECP-M film with a photomask that contains corresponding shapes and then exposing the film to UV light for 5 mins. The areas that are uncovered by the photomask is crosslinked, and the rest of the uncrosslinked film is washed away using chloroform. Likewise, another two layers of ECP-Y are spin-coated on the top of ECP-M patterns sequentially, and create the crosslinked line patterns. After obtaining the multilayer pattern, an optical profilometer is used to map out a periodic representative structure in this pattern (as shown in the dashed box section in FIG. 18(A)) and shown in FIG. 18(B), where the color codes indicate the height of the ECP surface. Remarkably, four different heights are observed on the film surface: blue background is the ITO substrate surface, green rectangles on the top of the substrate are the $1^{st}$ layer of ECP-M, oranges lines on the top of the rectangles are the $2^{nd}$ and $3^{rd}$ layers of ECP-Y, and small red rectangles are intersections of the three layers. The height profile of the film cross-section along the dashed line (shown in FIG. 18(B)) is further exacted and shown in FIG. 18(C). The dashed line do not across the $3^{rd}$ layer ECP-Y lines, so the thickness of the triple-layer ECP stacking is not shown. As shown in FIG. 18(C), The rectangles patterns have a thickness of around 200 nm, and the line patterns have around 400 nm after subtracting the substrate thickness. This rich textured surface makes it suitable for various great potential applications, such as in counterfeiting printing or color texture display. Further, the electrochromism of the multilayer pattern is monitored under the optical microscope, as shown in FIGS. 19(A)-(C). At −0.2V (FIG. 19(A)), both the ECP-M and ECP-Y are in colored states, making the cubes and lines all in vivid colors. At 0.7 V (FIG. 19(B)), ECP-M gets oxidized, leaving only line patterns visible. At 1.2V (FIG. 19(C)), both lines and cubes are bleached out. These voltage-dependent ECP patterns enhance the information expression capabilities, allowing for a more versatile and intelligent color display of ECP.

In another aspect, this disclosure also presents a method to control the color and multicolor capability of the disclosed ECDs with a plurality of EC layers. The method comprises adjusting the parameters of each electrochromic layer, including electrochromic material and thickness of each layer.

To demonstrate the capabilities to control the color and multicolor capability for the disclosed ECDs, different double-layer ECP stacking thin films are used as examples. The underlying EC layer, which is closer to the electrode, is crosslinked. To achieve this, the ECP solution to form the underlying EC layer further comprises 4 wt % bisFA as a linker. The Crosslinking process is performed by shining the thin film under UV light for 5 minutes in an $N_2$ filled glove box before spin-coating the top EC layer on top of the underlying EC layer. The top EC layer, which is farther away from the electrode, is not crosslinked.

EC Materials

Figure 20A:
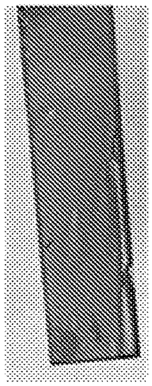
FIGS. 20(A)-(B) are images of two example double-layer ECP stacking thin films.
Figure 20B:
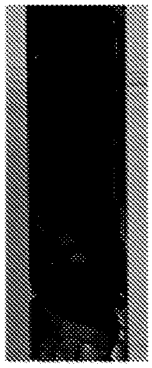
Figure 21:
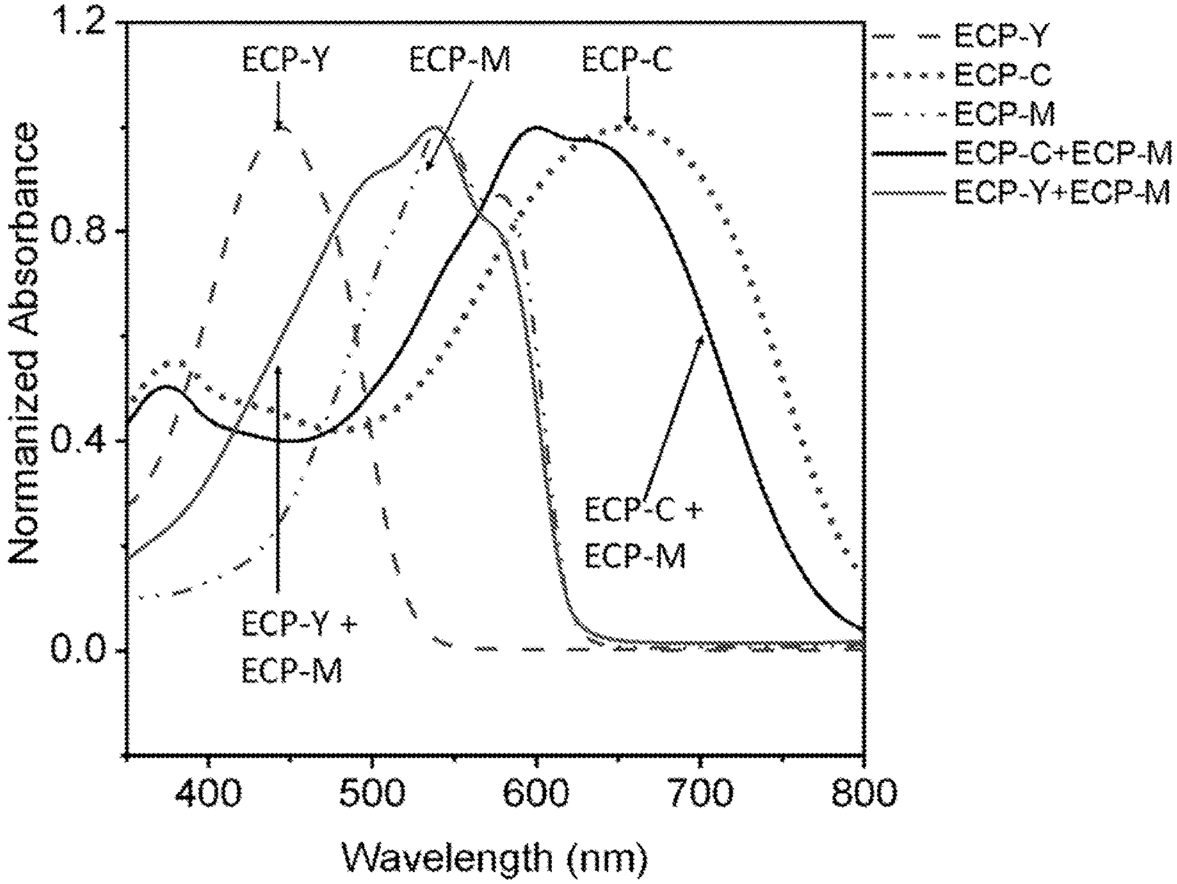
FIG. 21 shows UV-vis spectra of two example double-layer ECP stacking thin films shown in FIGS. 20(A)-(B).

Distinct colors can be obtained by combining EC materials with different colors, as shown by two double-layer ECP stacking thin film images in FIGS. 20(A)-(B) and absorbance spectra in FIG. 21. A double-layer ECP stacking thin film is formed by disposing a crosslinked ECP-Y layer underlying a top ECP-M layer (FIG. 20(A)), while the other one is formed by disposing a crosslinked ECP-C layer underlying a top ECP-M layer (FIG. 20(B)). The combination of ECP-Y and ECP-M layers shows a peachish pink integrated color shown in FIG. 20(A), and the combination of ECP-C and ECP-M layers show an purple-black integrated color shown in FIG. 20(B). Absorbance spectra in FIG. 21 further demonstrate that the absorbance peaks of the double-layer ECP stacking thin film reflect the sum of the absorbance peaks from its corresponding single color thin films. These two example double-layer ECP stacking thin films with different combinations of EC layers can display different absorbance spectra, which correspond to different colors. Both FIGS. 20(A)-(B) and FIG. 21 demonstrate the multilayer ECP stacking thin films can form different colors by adjusting the combination of electrochromic materials.

Film Thickness

Figure 22A:
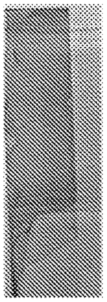
FIGS. 22(A)-(B) are images of two example double-layer ECP stacking thin films.
Figure 22B:
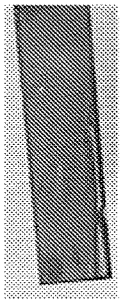
Figure 23:
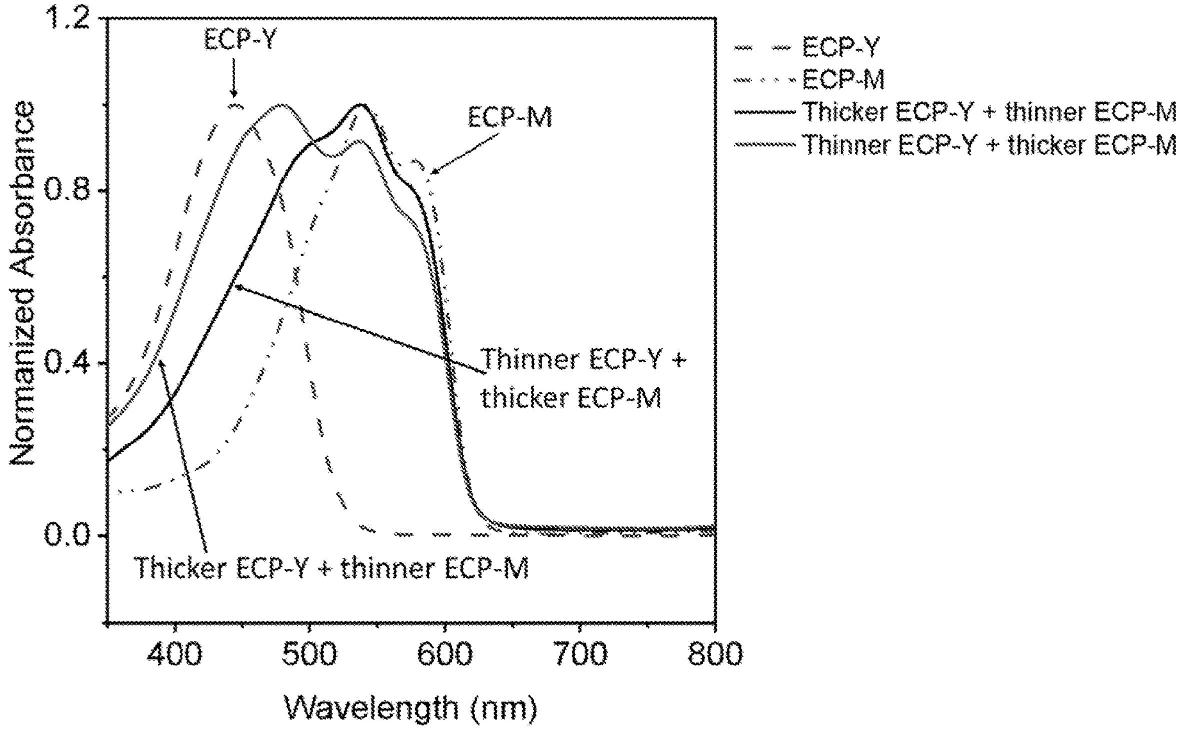
FIG. 23 is UV-vis spectra of two example double-layer ECP stacking thin films shown in FIGS. 22(A)-(B).

Different colors can be achieved by adjusting EC layers' thicknesses. To demonstrate the effect of EC layer's thickness on the integrated color, two double-layer ECP stacking thin films are made from the same color combination (an ECP-Y layer underlying a top ECP-M layer) with different thicknesses of each layer. Since all the thin film casting conditions are the same, there is a correlation between ECP solution concentration and the thin film thickness. As shown in FIGS. 11(A)-(C), a higher concentration of ECP solution will lead to a thicker EC layer. FIG. 22(A) shows an image of a thin film with a thicker ECP-Y layer underlying a thinner top ECP-M layer while FIG. 22(B) shows an image of an thin film with a thinner ECP-Y layer underlying a thicker top ECP-M layer. The thin film with thicker ECP-Y layer and thinner top ECP-M layer (FIG. 22(A)) shows a more yellowish color than the one with thinner ECP-Y layer and thicker top ECP-M layer (FIG. 22(B)). The absorbance spectra shown in FIG. 23 also present less absorption at about 550 nm but a little higher absorption at about 450 nm. FIGS. 22(A)-(B) and FIG. 23 demonstrate that the multilayer ECP stacking thin films can form different colors by adjusting the thickness of each EC layer.

What is claimed is:

1. An electrochromic device, comprising
- a first transparent electrode;
- a plurality of electrochromic layers stacked sequentially on the first transparent electrode;
- an ion storage layer disposed on the electrochromic layers; and
- a second transparent electrode disposed on the ion storage layer,
- wherein:
- at least one of the plurality of electrochromic layers disposed beneath another electrochromic layer is a crosslinked electrochromic layer,
- wherein the crosslinked electrochromic layer is configured to resist solvent dissolution or swelling during solution deposition of a subsequent electrochromic layer.

2. The electrochromic device of claim 1, wherein an uppermost electrochromic layer of the plurality of electrochromic layers is crosslinked.

3. The electrochromic device of claim 1, wherein crosslinking of the crosslinked electrochromic layer happens without a crosslinker.

4. The electrochromic device of claim 1, wherein crosslinking of the crosslinked electrochromic layer happens with a crosslinker.

5. The electrochromic device of claim 1, wherein a film thickness of each of the plurality of electrochromic layers is adjusted to obtain different colors.

6. The electrochromic device of claim 1, wherein the plurality of electrochromic layers include different electrochromic materials to obtain different colors.

7. The electrochromic device of claim 1, wherein the plurality of electrochromic layers include one layer of an electrochromic polymer with cyan color, one layer of an electrochromic polymer with magenta color, and one layer of an electrochromic polymer with yellow color.

8. The electrochromic device of claim 7, wherein the electrochromic device presents a black color with a minimized intermediate color, wherein:

a stacking sequence of the three color layers is the layer of the electrochromic polymer with cyan color as a bottom layer, the layer of the electrochromic polymer with magenta color as a top layer, and the layer of the electrochromic polymer with yellow color interposed between the bottom layer and the top layer; and a film-thickness ratio of the three color layers from the bottom to the top is 25:8:10.

9. An electronic device incorporating the electrochromic device of claim 1.

10. The electronic device of claim 9, wherein the plurality of electrochromic layers comprise multilayer electrochromic polymer patterns with surface texture information.

* * * * *